US005890270A

United States Patent [19]

Oetiker

[11] Patent Number: 5,890,270

[45] Date of Patent: Apr. 6, 1999

[54] APPARATUS FOR INSTALLING CLAMPING RINGS

[75] Inventor: Hans Oetiker, Horgen, Switzerland

[73] Assignee: Hans Oetiker AG Maschinen-und Apparatefabrik, Horgen, Switzerland

[21] Appl. No.: 795,708

[22] Filed: Feb. 4, 1997

Related U.S. Application Data

[60] Provisional application Nos. 60/011,984 Feb. 21, 1996 and 60/032,005 Nov. 25, 1996.

[51] Int. Cl.[6] .................... B23P 19/02

[52] U.S. Cl. .................... 29/235; 29/238; 29/282; 72/402

[58] Field of Search .................... 29/235, 238, 243.51, 29/255, 263, 272, 280, 282; 269/25; 72/402, 452.6

[56] References Cited

U.S. PATENT DOCUMENTS

| | | | |
|---|---|---|---|
| 1,890,016 | 12/1932 | Smith et al. | 29/238 |
| 3,103,062 | 9/1963 | Himmelberger | 29/238 |
| 3,530,900 | 9/1970 | Kish . | |
| 3,568,495 | 3/1971 | Duffield et al. | 72/402 |
| 3,920,232 | 11/1975 | Clark | 269/25 |
| 3,979,814 | 9/1976 | Lajoie et al. | 29/272 |
| 4,345,453 | 8/1982 | Lillbbacka | 72/402 |
| 4,989,443 | 2/1991 | Sawdon . | |
| 5,257,525 | 11/1993 | Clarke | 72/402 |
| 5,426,842 | 6/1995 | DeBoalt et al. | 29/272 |
| 5,666,711 | 9/1997 | Pfeiffer | 29/272 |

FOREIGN PATENT DOCUMENTS

| | | |
|---|---|---|
| 2270029 | 12/1975 | France . |
| 1452628 | 4/1970 | Germany . |
| 1452623 | 7/1970 | Germany . |
| 1752181 | 8/1971 | Germany . |
| 2511942 | 9/1976 | Germany . |

*Primary Examiner*—David A. Scherbel

*Assistant Examiner*—Lee Wilson

*Attorney, Agent, or Firm*—Birch, Stewart, Kolasch & Birch, LLP

[57] ABSTRACT

A machine for fastening a compression ring on an object to be fastened by shrinking the ring in which segmental actuating slide members are movable within a housing along circular paths with a constant radius about a center, and in which segments on the inside of the slide members are operable to move a limited distance in the radial direction; the segmental slide members are provided with internal surface portions of non-constant radial distance from a center, and the segments are provided with surface portions for abutment with the non-concentric surface portions on the inside of the slide members; an actuating mechanism operatively connected with the slide members causes the latter to close and thereby forces the segments to reduce the inside diametric dimension thereof which in turn causes compression of a shrink-ring held thereat.

27 Claims, 13 Drawing Sheets

FIG. 6
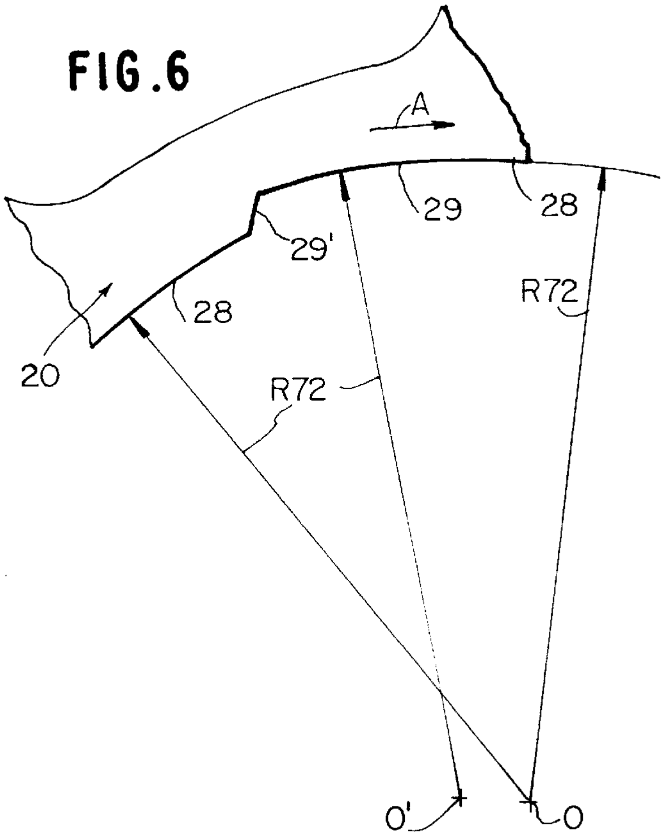
FIG. 7
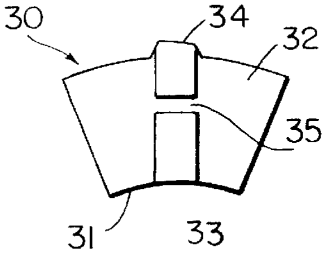
FIG. 8
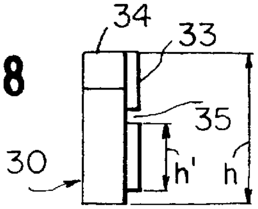
FIG. 9
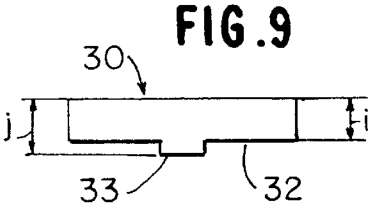
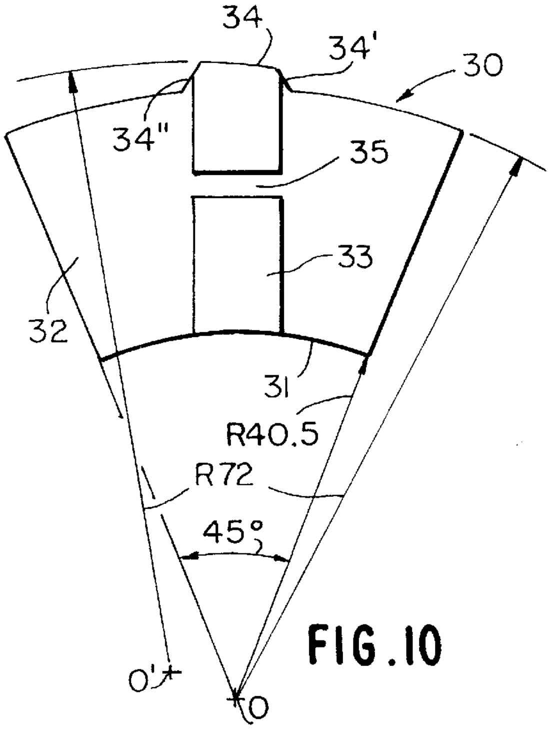
FIG. 10
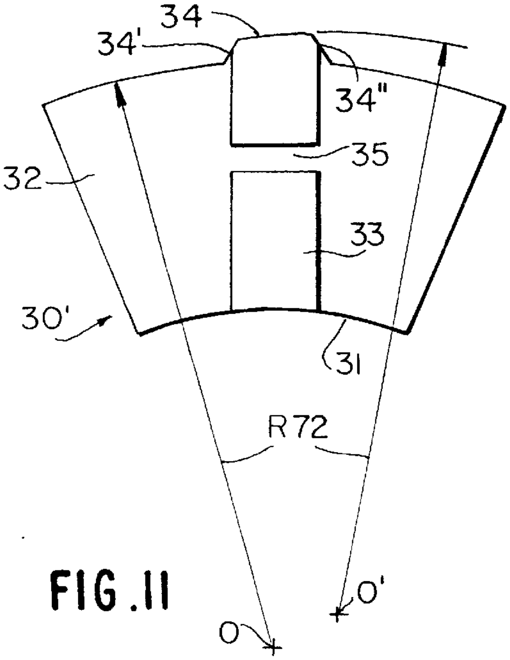
FIG. 11

FIG. 13
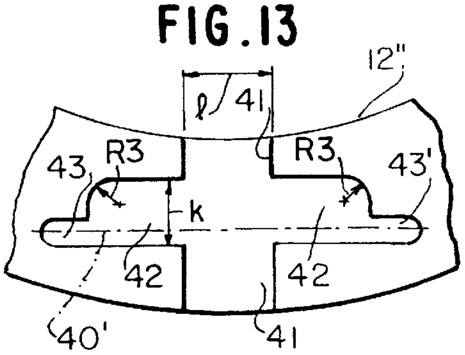
FIG. 12
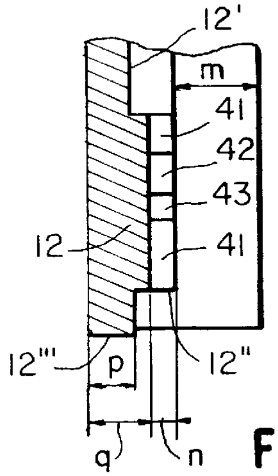
FIG. 17
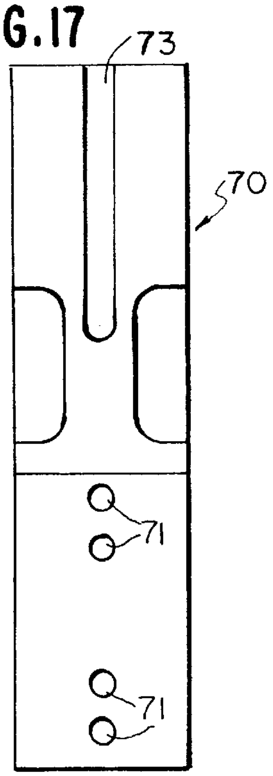
FIG. 19
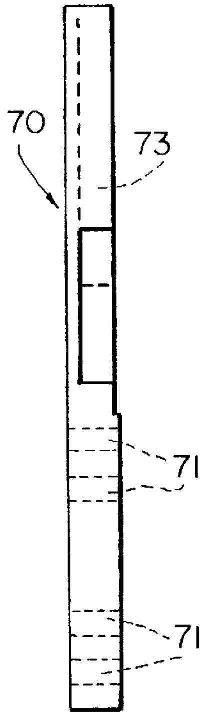
FIG. 14
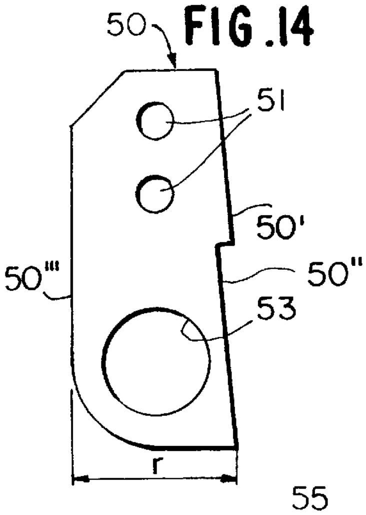
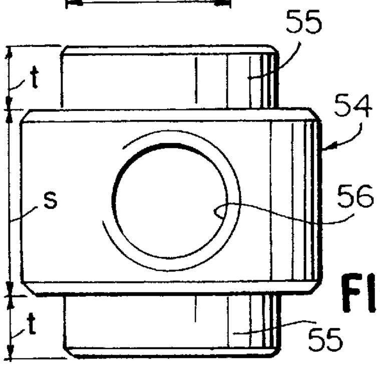
FIG. 15
FIG. 18
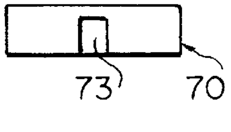
FIG. 16
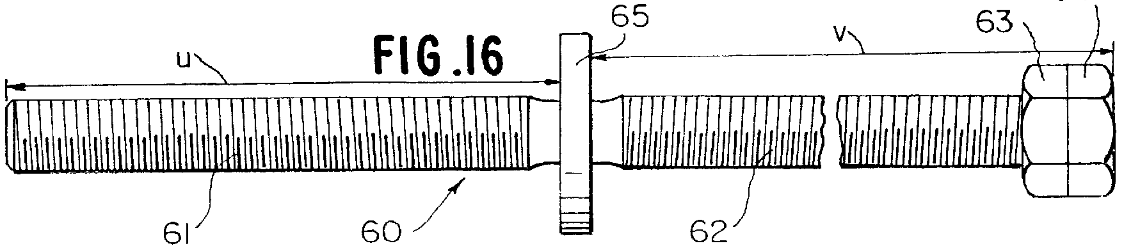

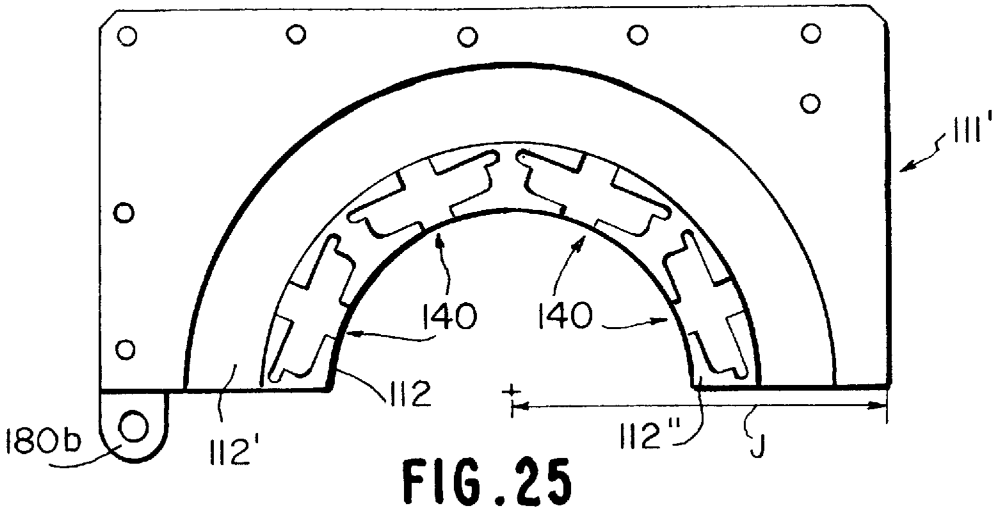
FIG. 25
FIG. 26
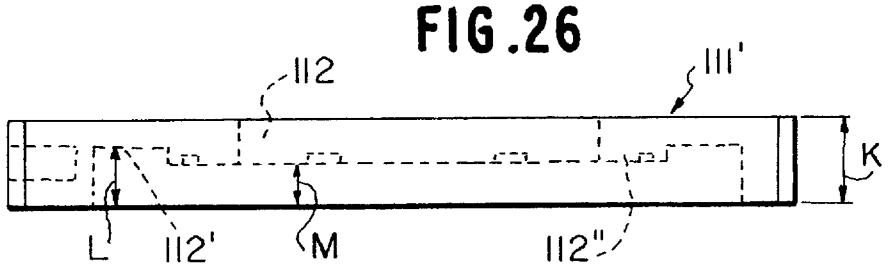
FIG. 27
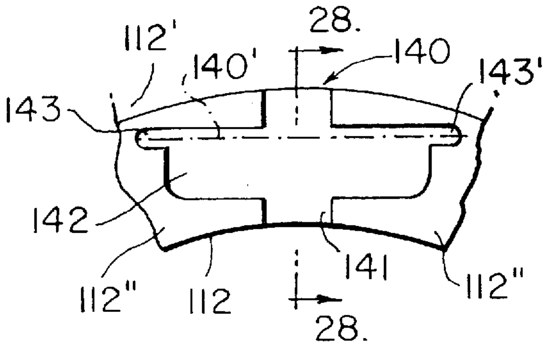
FIG. 28
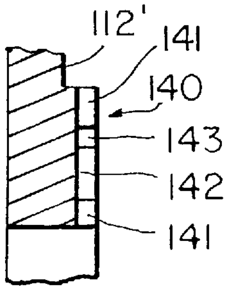

FIG. 29
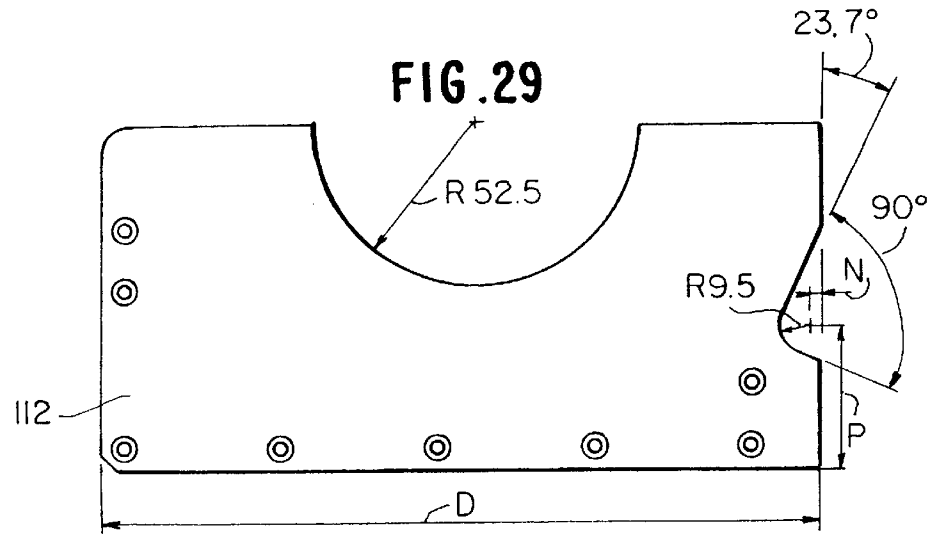
FIG. 30
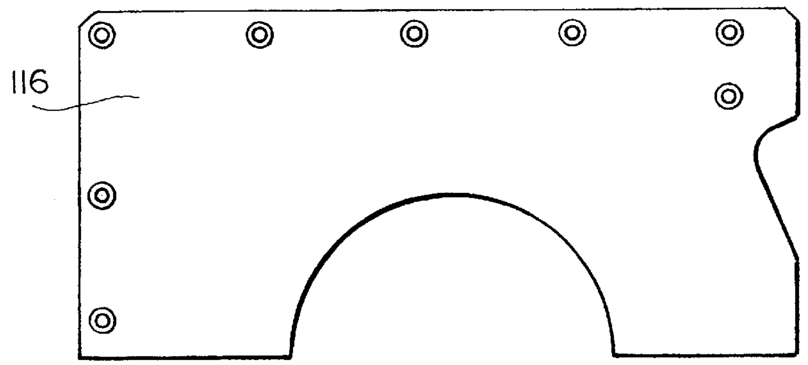
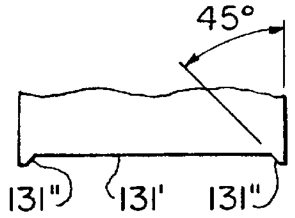
FIG. 35
FIG. 33
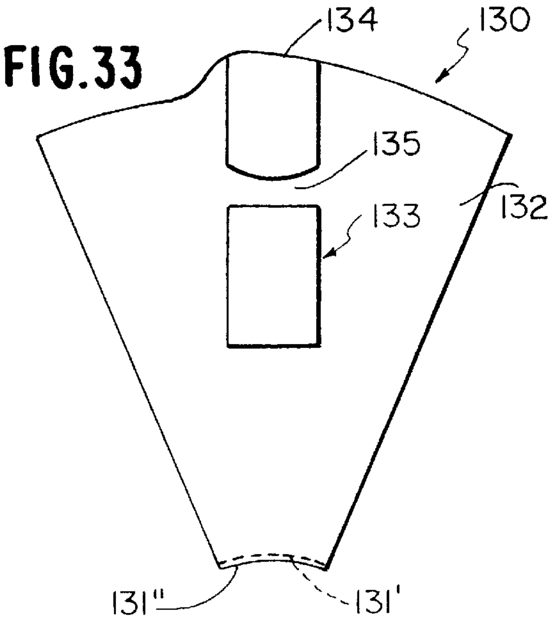
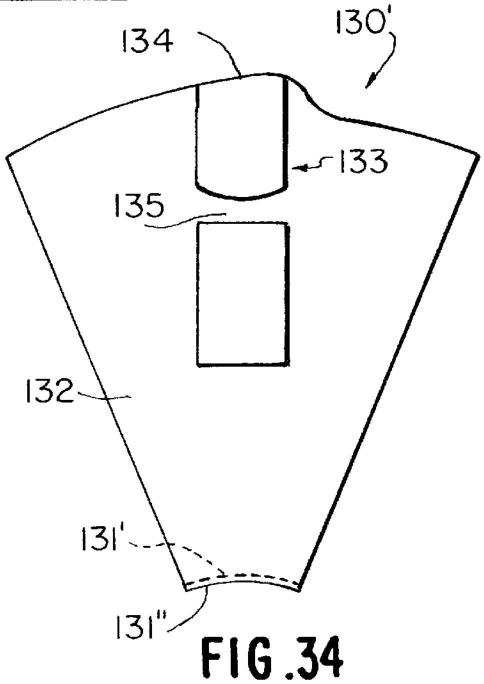
FIG. 34

APPARATUS FOR INSTALLING CLAMPING RINGS

FIELD OF THE INVENTION

This invention relates to a machine for installing clamping or compression rings by forcibly reducing the diameter thereof by shrinking and is a continuation-in-part application of the Provisional application Ser. No. 60/011,984, filed on Feb. 21, 1996. This application claims Benefit of Provisional application Ser. No. 60/032,005 filed Nov. 25, 1996.

BACKGROUND OF THE INVENTION

Various clamping devices are known in the prior art for fastening, for example, hoses or axle boots onto nipples or axle stubs. So-called open hose clamps which are made from band material and adapted to be mechanically interconnected before tightening the same are usually provided with means for tightening the clamp, such as a screw or bolt, a worm drive or a so-called "Oetiker" ear as disclosed in U.S. Pat. No. 4,299,012. On the other hand, endless clamping rings made from tubular stock are also known to be used for the same purpose. These endless clamps are tightened, for example, also by the use of a so-called "Oetiker" ear as disclosed in U.S. Pat. No. 2,614,304 or with a machine for shrinking the ring whereby such a machine may be hydraulically, pneumatically, mechanically or magnetically actuated. However, many of these types of machines are very expensive and therefore out of reach for the ordinary after market. Nor are many of such machines of the portable type as needed, for example, for demonstration purposes of the use of such shrinkable clamping or compression rings.

The endless types of clamps or compression rings are manufactured, for example, by sawing-off, punching-off or cutting-off ring-like segments from tubular members and have been used, for example, in the automotive industry with the use of so-called Magnaform machines which electromagnetically shrink the rings. Apart from costs, these machines are very noisy in operation.

Crimping tools are also known in the art for crimping various devices, such as with electrical cable connection, in the oil industry for connecting pipe sections, etc. These crimping tools normally include oppositely directed tapering surfaces on segments of ring-like parts for engagement with correspondingly shaped surfaces on projections of the parts to be connected.

SUMMARY OF THE INVENTION

The use of such clamping or compression rings is becoming increasingly popular because relatively inexpensive clamping or compression rings have become available which can be manufactured from band material and are interconnected by a so-called puzzle-lock arrangement capable of withstanding significant tensional forces, as disclosed, for example, in U.S. Pat. Nos. 5,001,816 and 5,185,908. To demonstrate the use of such clamping or compression rings and/or permit actual use thereof in the after-market requires a machine which is relatively cost-effective and easy to use.

Accordingly, it is an object of the present invention to provide a machine for installing clamping or compression rings by shrinking the same onto the object to be fastened which is relatively simple in construction and cost-effective as well as easy to use.

The machine according to one embodiment of this invention consists of segmental slide members constrained to move along circular paths within a housing when drawn toward one another, respectively, moved apart from one another, whereby the internal surfaces of the segmental slide members have surface portions that decrease in radius with respect to the center of the machine and are adapted to engage with complementary abutment surfaces provided on segments having circularly shaped internal clamping surfaces so that these circular surfaces are reduced in diameter as the slide members are moved toward one another and the clamping or compression rings placed on the inside of the segments are thereby forcibly shrunk.

According to another feature of an embodiment of this invention, the segmental slide members are provided with elongated openings all disposed on a constant radius and having a constant width for engagement with roller members mounted on pins supported in the housing and on the housing cover.

According to still another feature of an embodiment of this invention, the segments are provided with raised portions adapted to engage in channels cut into a raised circular portion of the housing bottom so as to constrain movement of the segments to radial directions, whereby spring elements are inserted into grooves in the housing bottom disposed at right angle to the channels and adapted to engage with complementary grooves in the raised portions of the segments so as to urge the segments radially outwardly when the sliding members are moved in the opening direction.

According to still another feature of a preferred embodiment of this invention, a spindle is used having oppositely directed threads at the two ends thereof which are adapted to engage with trunion-like pivot members pivotally retained in radial arm portions forming radial extensions of the segmental slide members to draw the slide members toward one another and away from one another along the circular paths. To keep the spindle centered, a circular dish-like member fixedly arranged on the spindle is adapted to rotate in a groove of a centering plate fixed to the housing.

According to another embodiment of this invention, the segmental slide members are connected with a slide carriage, constrained by a spline connection to move rectilinearly within the housing for the slide carriage, whereby rectilinear to-and-fro movement is imparted to the slide carriage by a spindle freely rotatable relative to the slide carriage but fixed for axial movement in unison therewith. The spindle thereby engages with a stationary nut member so that the spindle will experience axial movement as it is rotated. The connection between the segmental slide members and the slide carriage is realized by pressure rollers which are connected with the slide members and which engage in angularly disposed channels in the slide carriage so that the pressure rollers are caused to approach one another, respectively, spread apart depending on the direction of movement of the slide carriage.

BRIEF DESCRIPTION OF THE DRAWINGS

These and other objects, features and advantages of the present invention will become more apparent from the following description when taken in connection with the accompanying drawing, which shows, for purposes of illustration only, several embodiments in accordance with the present invention, and wherein:

FIG. 6 is a partial plan view on the segmental slide member of FIG. 5 on an enlarged scale;

FIG. 7 is a plan view on one of the segments of the machine of FIG. 1;

FIG. 8 is a left side elevational view of the segment of FIG. 7;

FIG. 9 is a plan view on the segment of FIG. 7;

FIG. 10 is an enlarged plan view on the segment shown in FIG. 7;

FIG. 11 is a plan view, similar to FIG. 10, illustrating the segment used for the opposite side of the machine;

FIG. 12 is a partial cross-sectional view, on an enlarged scale, taken along line 12—12 of FIG. 2;

FIG. 13 is a partial plan view, on an enlarged scale, showing details of the housing bottom;

FIG. 14 is a plan view on the pivot plate used in the machine of FIG. 1;

FIG. 15 is an elevational view, on an enlarged scale, of a pivot pin used in the machine of FIG. 1;

FIG. 16 is a plan view on the spindle used in the machine of FIG. 1;

FIG. 17 is a plan view on the centering plate used in the machine of FIG. 1;

FIG. 18 is a view on the centering plate from above;

FIG. 19 is a side elevational view of FIG. 17;

FIG. 25 is a plan view on the upper housing part of FIG. 22;

FIG. 26 is a front elevational view of the housing part of FIG. 25;

FIG. 27 is a partial view, on an enlarged scale, showing details of the housing bottom;

FIG. 28 is a cross-sectional view taken along line 28—28 of FIG. 27;

FIG. 29 is a plan view on the housing cover for the lower housing part;

FIG. 30 is a plan view on the housing cover for the upper housing part;

FIG. 33 is an elevational view of a segment for one side of the machine of FIG. 22;

FIG. 34 is an elevational view, similar to FIG. 33, and showing a segment as used for the other housing part;

FIG. 35 is a partial elevational view, on an enlarged scale, showing some details of the internal surface of the segments of FIGS. 33 and 34;

DETAILED DESCRIPTION OF THE DRAWING

Figure 4:
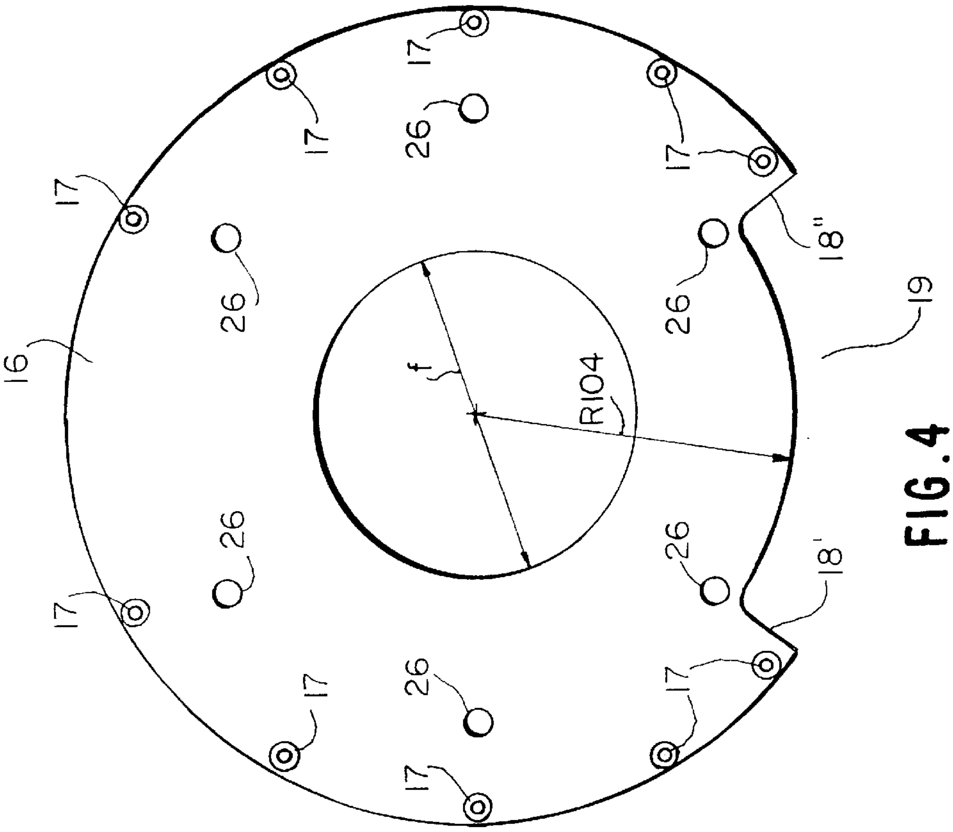
FIG. 4 is a plan view on the housing cover.

Referring now to the drawing wherein like reference numerals are used throughout the various views to designate like parts, the machine for shrinking clamping or compression rings is generally designated by reference numeral 10 (FIG. 1) and includes a housing generally designated by reference numeral 11 (FIG. 2) which is of circular construction about the housing center O and includes a bottom 12 surrounded by a peripheral rim 13 terminating at radially extending wall edge portions 13' and 13" to provide a cut-out or opening 14 in the housing that permits closing and opening movement of the actuating segmental slide members 20 and 20' by way of the pivot plates 50 connected thereto and to be described more fully hereinafter. The rim 13 is provided with ten threaded bores 15 for engagement by screws (not shown) to fasten the housing cover 16 (FIG. 4) provided with corresponding bores 17 which are preferably of the countersunk type so as to be able to mount the screws flush with the surface of the cover. As shown in FIG. 4, the housing cover, like the housing bottom 12, does not extend over the entire circumference but terminates at wall edge portions 18' and 18" to provide a cut-out opening 19 for purposes to be described hereinafter.

Figure 5:
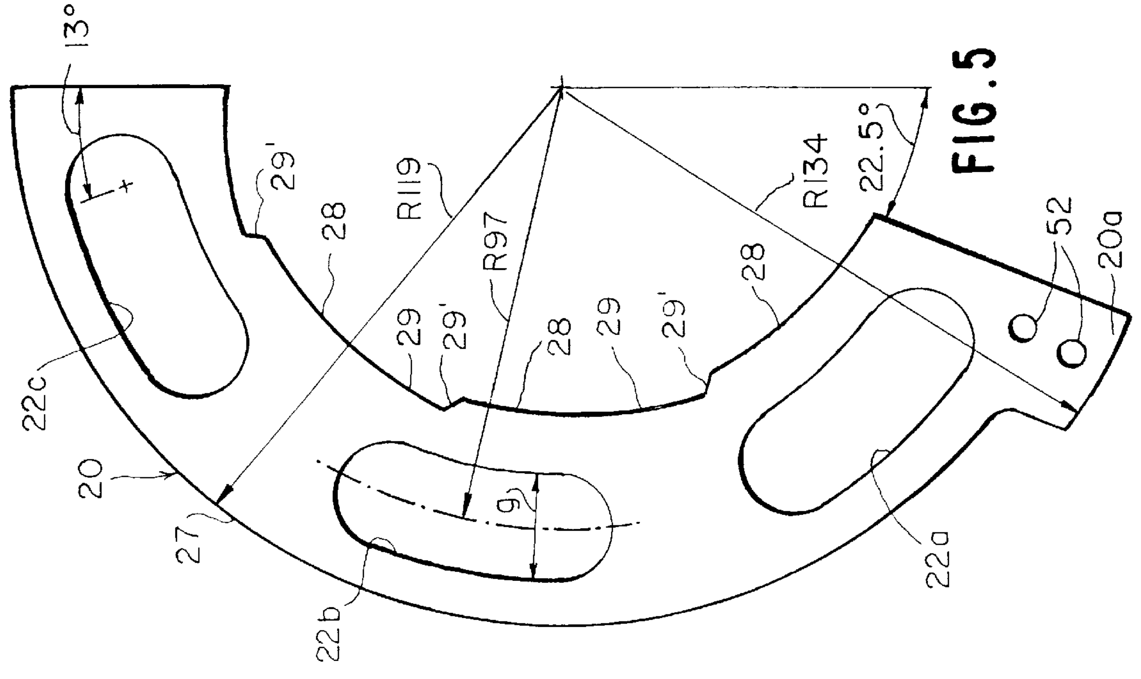
FIG. 5 is a plan view on the left segmental slide member of the machine of FIG. 1.

Two actuating segmental slide members 20 and 20' (FIGS. 1 and 5) which are of mirror-image-like construction and of which the left slide member is shown in FIG. 5 are each provided with three similar elongated openings 22*a*, 22*b*, 22*c* and 22'*a*, 22'*b*, 22'*c*, all disposed along a constant circle R97 and of constant radial width whereby the end portions are rounded off by semi-circles of a radius half the radial width of the openings. Six roller members 23 (FIG. 1) are mounted on six pins 24 fixedly secured in holes 25 and 26 provided in the housing bottom 12 and the housing cover 16, respectively. The rollers 23 have a diameter nominally of the same dimension as the radial width of the elongated openings but slightly smaller so as to permit sliding movements of the slide members 20 and 20' when actuated. This arrangement limits the actuating slide members 20 and 20' to a purely circular movement, also made possible by the circular external surfaces 27 and 27' of the segmental slide members 20 and 20' which have a constant radius R119 (FIG. 5) that is slightly less than the internal diameter of rim 13. The internal surfaces of the slide members 20 and 20' consist each of a concentric inner surface portion 28 (FIG. 6) concentric with respect to the center O of the machine with a radius R72 and of a non-concentric surface portion 29 realized by radial portions with a radius R72 but drawn about the displaced center O' (FIG. 6). This produces internal surfaces portions 29 which have a radial spacing from the center O of the machine decreasing gradually in the direction of arrow A (FIG. 6) whereby a concentric portion is connected with a non-concentric portion by way of a step 29'.

The machine further includes four segments generally designated by reference numeral 30 and four segments generally designated by reference numeral 30', again of mirror-image-like construction which have each a clamping surface 31 of constant radial dimension (FIGS. 10 and 11). The surface 32 of each segment 30, 30' includes a raised portion generally designated by reference numeral 33 extending in the radial direction which is of substantially constant width (FIGS. 7–11). The raised projection 33 is provided with an external surface portion 34 for abutting engagement with surface portions 28 and 29 on the slide members 20 and 20'. The surface portion 34 of a respective segment is thereby inclined at least in part in a manner complementary to the inclination formed by the corresponding surface portion 29. The raised portion 33 is further interrupted by a transversely extending channel 35 to accommodate a spring member, for example, a wire spring 40' schematically indicated in FIG. 13.

Figure 2:
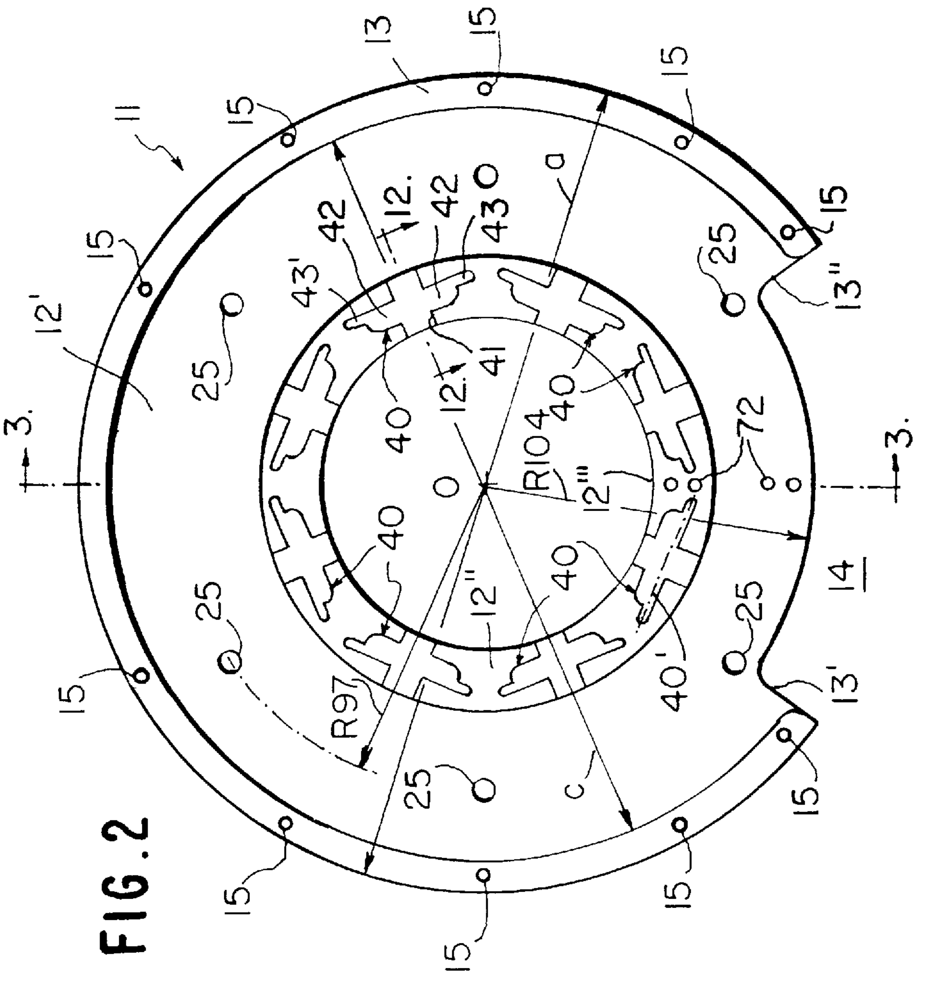
FIG. 2 is a plan view on the housing by itself of the machine shown in FIG. 1.

The housing bottom 12 is provided with a recessed bottom portion 12' (FIGS. 2, 3, 12 and 13) and with eight guide configurations generally designated by reference numeral 40 open from above and cut into the embossed annular part 12" of the housing bottom. The guide configuration which resembles a thunderbird-like shape includes a radial channel 41 intersected at right angle by a transverse channel 42 which terminates in finger-like end portions 43 and 43' for engagement by a wire spring 40' (FIGS. 2 and 13). In the assembled condition, the raised projection 33 of the segments 30 and 30' thereby engage with the radial channels 41 and therefore are constrained to radial movement as the radial position of a segment from center O gradually decreases by engagement of its abutment surface portion 34 with the surface portion 29 during closing movement of the slide members 20, 20'. The circular opening 12'" in the housing bottom 12 is indicated in FIGS. 2 and 12.

The segmental slide members 20 and 20' are further provided with radially outwardly extending arm portions **20*a* (FIG. 5) whereby two pivot plates generally designated by reference numeral 50 (FIG. 1) are fastened to opposite sides of each arm portion 20*a*. The pivot plates 50 thereby have a thickness such that the thickness of the pivot plates 50 and of the slide member 20 or 20' is substantially equal to the thickness of the machine, i.e., such that they are able to move freely in the cut-out 14 of the housing bottom 12' without projection, and in the cut-out 19 in the housing cover 16, preferably flush therewith. The pivot plates 50 (FIG. 14) are provided with two bores 51 corresponding with bores 52 in segmental slide members 20 and 20' to fasten these three parts together with screws and nuts (not shown) or the like. The pivot plates 50 are further provided with a pivot bore 53 to pivotally accommodate a threaded pivot pin generally designated by reference numeral 54 (FIG. 15) which is provided with trunion-like bearing surfaces 55 on opposite sides thereof to engage in the bores 53 of the two spaced pivot plates 50 fastened to the top and bottom of a respective radial arm 20*a*. Each pivot pin 54 is additionally provided with a threaded bore 56 at right angle to the axis of the bearing surfaces and of a thread adapted to engage with a respective threaded portion 61 and 62 of the spindle generally designated by reference numeral 60 (FIG. 16) whereby the threaded portion 61 is a right-handed threaded portion and the portion 62 is a left-handed threaded portion so that upon rotation of the spindle in one direction the pivot plates 50 are drawn together and upon rotation in the other direction, the pivot plates 50 are spread apart, imparting similar circular closing and opening motions to the segmental slide members 20 and 20'. In order to permit threading of the pivot pins 54 on the spindle portion 62, two nuts 63 and 64, which form a fixed abutment when tightened together, are provided which must be removed so as to permit threading of the corresponding pivot pin on the threaded portion 62. Moreover, the top pivot plate 50 must be disconnectable at its fastening means, for example, by unscrewing the corresponding nuts in order to install the assembled spindle 60 with pivot pins 54 mounted thereon in the bores 53**.

A centering plate generally designated by reference numeral 70 (FIGS. 17–19) is fastened to the housing bottom 12 by means of four bolts, screws or the like engaging in bores 71. For that purpose, the housing bottom is also provided with four threaded bores 72 shown only in FIG. 3. The centering plate 70 is additionally provided with a slot 73 in which a disk-like member 65 formed integrally with the spindle 60 or fixed thereto, for example, by welding, is adapted to rotate yet maintain its fixed, axial position.

FIGS. 29 and 30 illustrate, respectively, the lower housing cover 112 and the upper housing cover 116.

OPERATION

In operation, as the spindle 60 is rotated in one direction, the radial arm portions **20*a* and therewith the segmental slide members 20 and 20' are drawn toward one another by way of the pivot plates 50 and pivot pins 54 whereby the segments 30 are moved radially inwardly by engagement of their abutment surface portions 34 with the non-radial surface portions 29, thereby reducing the diametric dimension formed by the inner clamping surfaces 31 of the segments 30. Rotation of the spindle 60 in the opposite direction will spread apart the arm portions 20*a*. The segments 30 are not positively connected to the sliding members 20 and 20' but are merely in abutting engagement whereby the wire springs 40' will cause the segments 30 to follow a radial outward movement as permitted during opening rotation of spindle 60 by engagement of the surface portions 34 with the surface portions 29 that now increase gradually in diametric dimension. The spindle 60** may thereby be rotated manually, for example, with the use of a conventional socket wrench but is preferably rotated by the use of an electric, hydraulic or pneumatic motor adapted to be connected with the spindle.

Figure 1:
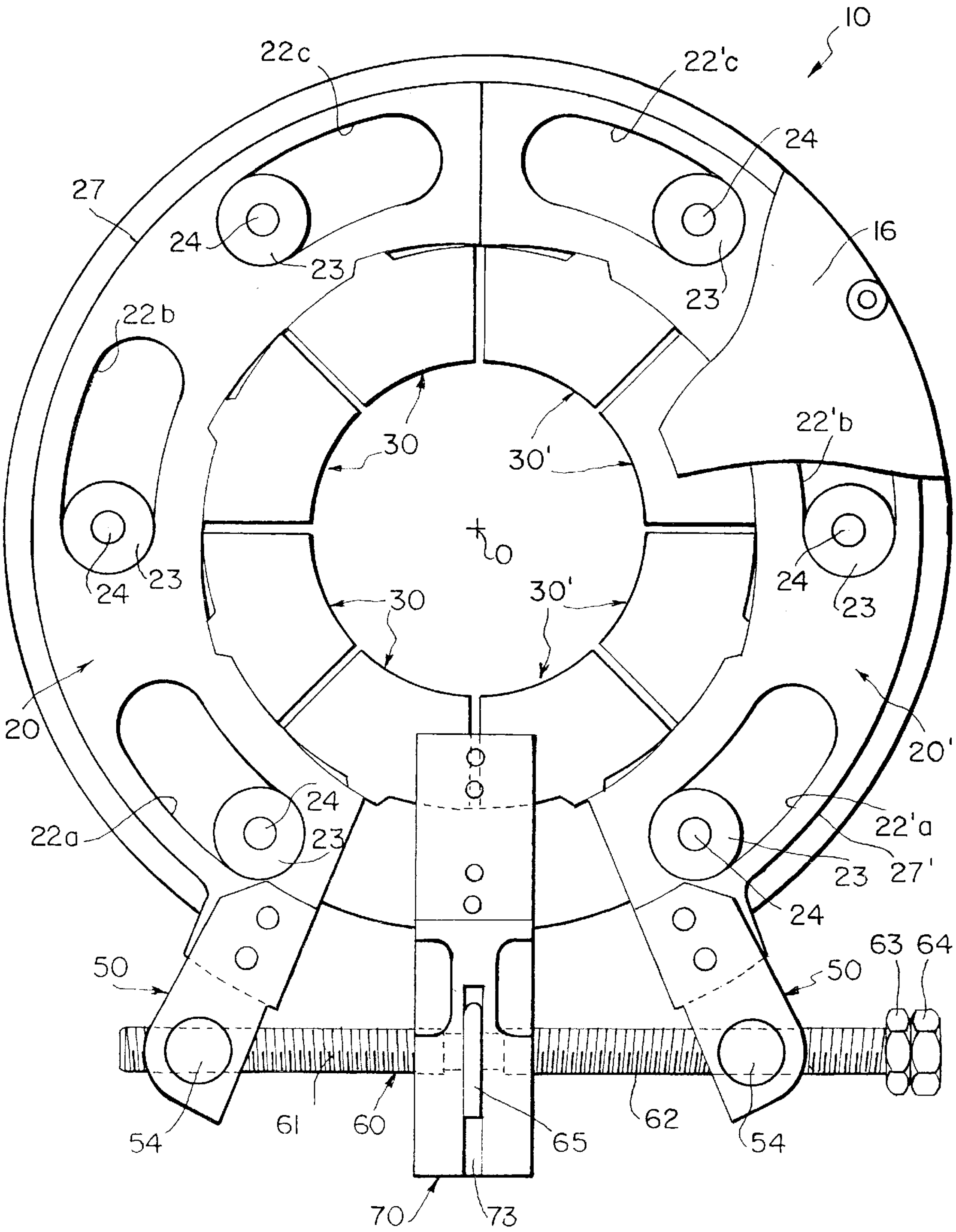
FIG. 1 is a plan view on a first embodiment of a machine for installing clamping or compression rings in accordance with the present invention, with parts broken away.
Figure 20:
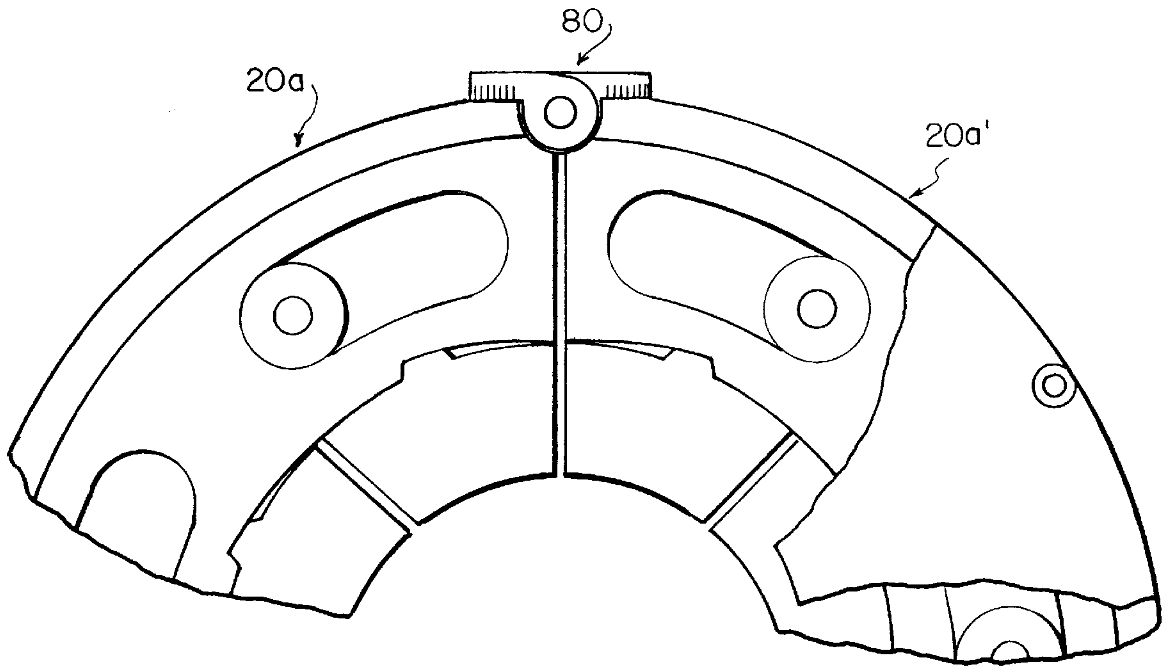
FIG. 20 is a partial top plan view of a modified embodiment of the machine in which the housing consists of two housing parts pivotally connected with each other.

FIG. 20 illustrates a modified embodiment of the machine of FIG. 1 in which the housing is made of two parts generally designated by reference numerals **20*a* and 20*a*' and pivotally connected by a hinge of conventional construction and generally designated by reference numeral 80. In that case, the open ends of the housing parts 20*a* and 20*a*' must be provided with a conventional lug, shackle or fastening plate to hold the parts together in the operating condition. Additionally, the pivot assembly 50, 53 on the side of the spindle 60 opposite the nuts 63 and 64 is then so constructed that the spindle can swing out about the opposite pivot assembly, preferably in such a manner that the swung-out pivot pin 54 is held in place along the threaded portion 61 of spindle 60. This can be achieved in any known manner, for example, by merely removing the fastening means at 51 and 52 after installing a clamp or the like which hold together the pivot plates 50. In the alternative, the two pivot plates 50 may already be provided with an additional fastening means, such as a screw and nut in conjunction with a spacer of appropriate length between the two fastening plates. This is also possible by the use of a two-partite construction of the two pivot plates 50 associated with a radial arm portion 20***a* such that they can be opened up by disengagement of any conventional connection such as a threaded connection to be separated along an arc having its center about the opposite pivot pin to permit the pivot movement. By making the separating joints in the pivot plates in such a manner that the swingable parts of the pivot plates 50 extend over more than 180° about the bearings surfaces 55 of the pivot pin 54, it is assured that the pivot pin 54 is not freely rotatable by itself on the spindle which might otherwise change its axial position. Additionally, the groove 73 may also be suitably curved to permit the disk-like member 65 to swing out.

FIGS. 21–44 illustrate a further embodiment in accordance with this invention in which the housing is of hinged construction and a different actuating mechanism is used for operating the machine. Parts corresponding to those of the embodiment of FIGS. 1–20 are designated by corresponding reference numerals of the 100 series such as 127, 128, 129, 129', 140–143, 132–135, will not be described in detail. The housing of the machine generally designated by reference numeral 110 consists of two housing parts generally designated by reference numerals 111 and 111' (FIGS. 23 and 25) which are pivotally connected at the hinge generally designated by reference numeral 180 and including lugs 180*a* and 180*b*. Two segmental slide members 120 and 120' are each in operative engagement with the four segments each generally designated by reference numeral 130 and located in the lower housing part 111 and by reference numeral 130' in the upper housing part 111'. The segmental slide members 120 and 120' are thereby guided within recesses 112' within the housing parts without the use of the guide rollers of the embodiment of FIGS. 1 through 19. However, if so desired, the guide roller arrangement of the embodiment of FIGS. 1 through 20 may also be used in the embodiment of FIGS. 21 through 43. As to the rest, the basic difference between the construction of the embodiment of FIGS. 1 through 19 and the construction of the embodiment of FIGS. 21 through 43, other than the omission of the guide rollers, resides in the fact that the segments 130, 130' have been made somewhat wider and are now provided with a bottom surface configuration in the bottom surface 131' (FIG. 35) forming a centering groove by inclined flank surfaces 131" to prevent the compression ring from escaping laterally.

Figure 36:
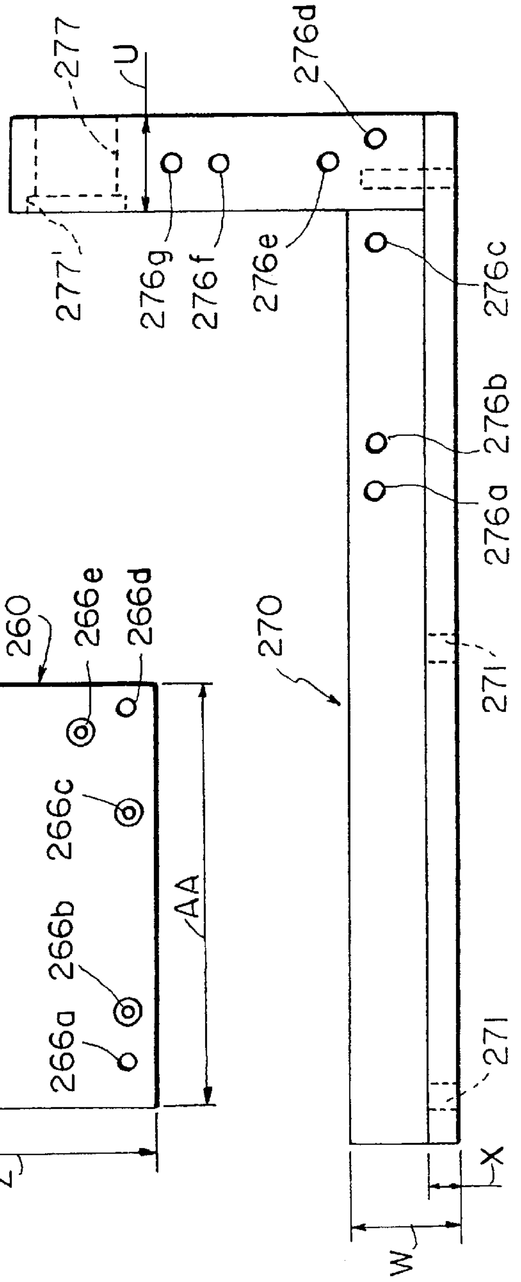
FIG. 36 is a plan view on the spindle holder of the machine of FIG. 21.
Figure 39:
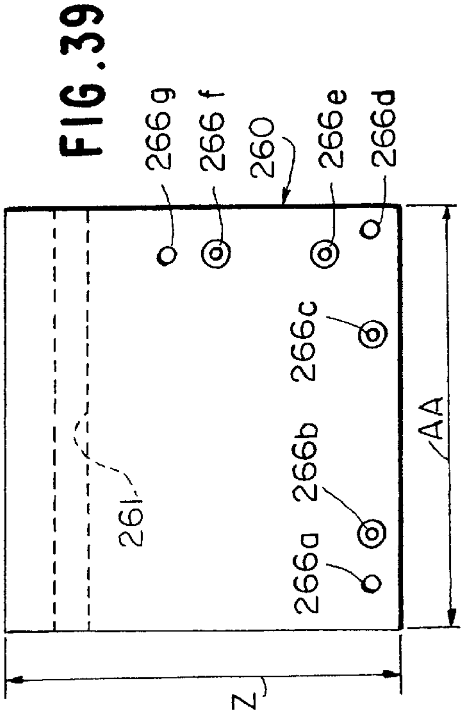
FIG. 39 is a plan view on a plate member used in the machine of FIG. 21.

For actuating the segmental slide members 120 and 120', the approximately radially extending arm portions 120*a* thereof are connected with pressure rollers 223 (FIG. 22) which are adapted to engage in guide grooves 251*a* and 251*b* of a slide carriage generally designated by reference numeral 250. The slide carriage 250 includes similar top and bottom members 252*a* and 252*b* (FIG. 22) which are interconnected by a core member 253 extending only over part of the length of the slide carriage 250. The two pressure rollers 223 connected with each arm portion 120*a* and 120*a*' are thereby adapted to engage in the guide grooves 251*a* and 251*b* which are provided in each of the upper and lower parts 252*a* and 252*b*. The slide carriage 250 is slidable within the space formed by a top plate generally designated by reference numeral 260 (FIGS. 22 and 39) and by a bottom plate generally designated by reference numeral 260' which is identical with the plate 260 except for the omission of the spline groove 261. The spline connection is obtained by means of a spline member (not shown) of rectangular configuration which is secured to the carriage member 252*a* in a complementary spline groove 254 (FIGS. 40–42) by means of screws engaging in threaded bores 255. By engaging in the spline groove 261 (FIG. 39) of the plate member 260, the spline member secured to the carriage member 252*a* prevents any lateral movement or canting of the slide carriage which is thereby constrained to rectilinear movements defined by the spline connection. The cover plates 260 and 260' are thereby secured to the top and bottom of the spindle holder generally designated by reference numeral 270 which is secured to the housing part 111 by means of bolts or screws or the like adapted to extend through bores 271 (FIGS. 36 and 37) and engage in threaded bores 210 (FIGS. 23 and 24) in the housing part 111. The plates 260 and 260' are thereby also threadably interconnected with the spindle holder 270 at the places indicated at 266*a* through 266*g* and 276*a* through 276*g* (FIGS. 36 and 39). The spindle holder 270 is also provided with an axial bore 277 extending in the direction of the spline connection which includes an enlarged part 277' to accommodate the spindle nut generally designated by reference numeral 280 (FIG. 44) having an enlarged head portion 281 for seating in the enlarged part 277' of the axial bore 277 of the spindle holder. To prevent the nut 280 from falling out of the bore 277, 277', it is provided with an annular groove to be engaged by a snap ring (not shown) of conventional type. Additionally, the nut 280 is prevented from rotating within the bore 277, 277' by any conventional means such as a spline connection, a pin or even a polygonal outer surface of the head portion 281 though annular bores are preferred for ease of manufacture. A spindle generally designated by reference numeral 160 (FIG. 43) having an external threaded portion 161 is adapted to engage in the stationary nut 280 so that rotation in the one or the other direction will cause the spindle 160 to move to and fro relative to the machine. The forward end of the spindle is provided with an annular groove 162 whereby a pin or threaded member suitably constructed and schematically indicated at 258 in FIG. 41 engages in annular groove 162 and thus provides a positive connection between the slide carriage 250 and the spindle 160 for to and fro movement while allowing the spindle 160 to rotate relative to the carriage 250.

Figure 40:
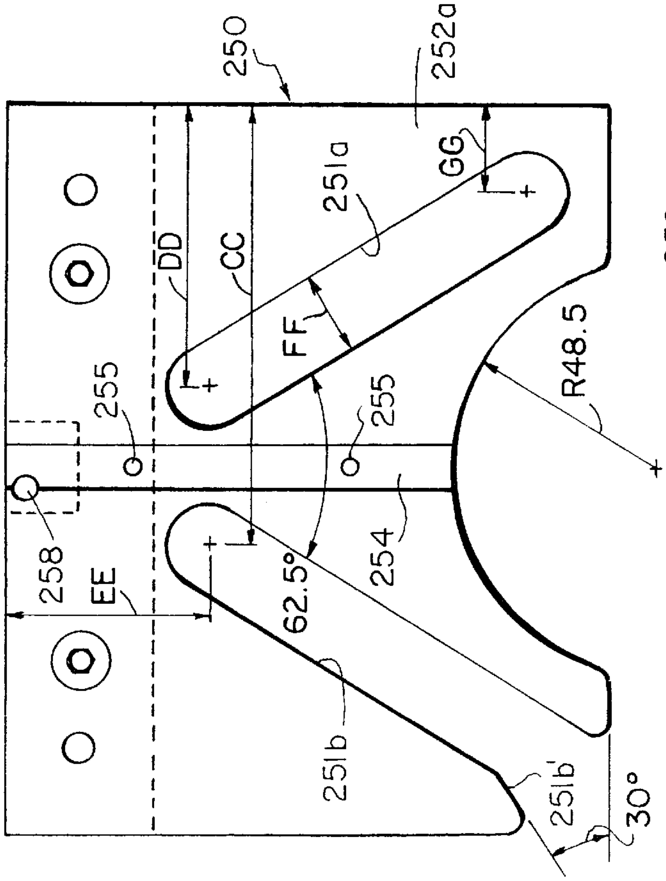
FIG. 40 is a plan view on the slide carriage member used in the machine of FIG. 21.

To permit opening and closing of the hinged housing part 111', the guide groove 251 is suitably configured at its entrance by widening the same at 251*b*' as shown in FIG. 40 so that the upper housing part 111, can be pivoted by swinging the pressure rollers 223 out of the guide groove 251*b* when the slide carriage 250 is moved into its position in which it is furthest removed from the housing parts 111, 111'.

The operation of the machine of FIGS. 21 through 44 is similar to that of the embodiment of FIGS. 1 through 19 in that movement of the slide carriage 250 toward the housing parts 111 and 111' will force the pressure rollers 223 to slide along the guide grooves 251*a* and 251*b* causing the arm portions 120*a* and 120'*a* to approach one another and thereby cause the segments 130, 130' to move radially inwardly in a diameter-reducing direction, whereby the compression ring held along the inner surfaces 131' of the segments 130, 130' are compressed. Movement of the slide carriage 250 in the opposite direction will again cause reopening of the segmental slide members 130, 130', followed by the outward movement of the segments 130, 130' as a result of the spring action of the wire spring or the like.

The spindle 160 may again be rotated manually or by means of an electric motor, hydraulic motor or pneumatic motor. Moreover, the spindle may also be replaced by an hydraulic, pneumatic or electromagnetic piston cylinder unit for the drive, particularly in case of automatization of the machine.

Figure 44:
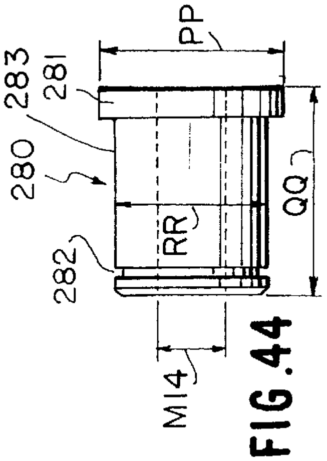
FIG. 44 is an elevational view of the spindle nut member used in the machine of FIG. 21.
Figures 45, 46:
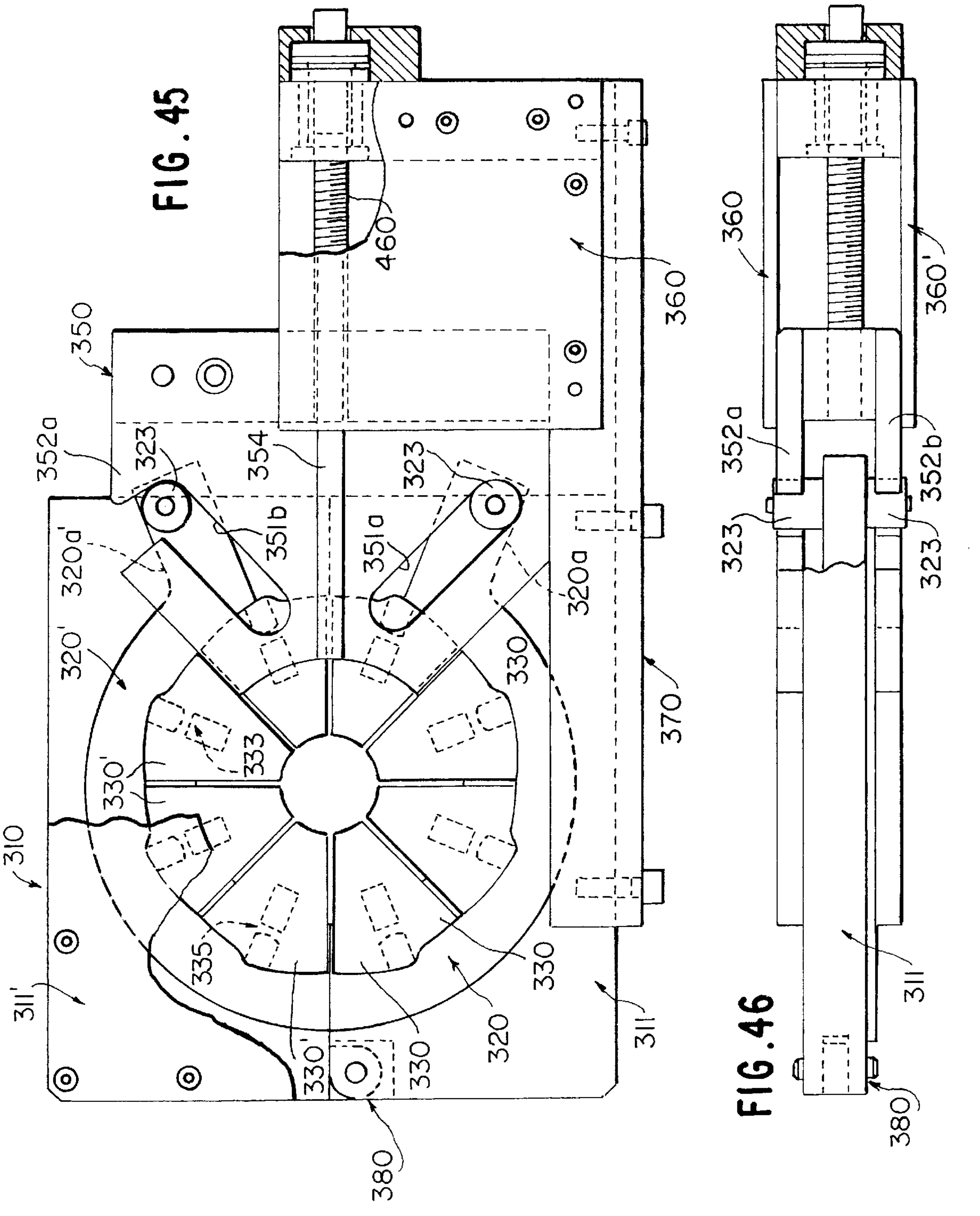
FIG. 45 is a plan view, partly broken away, of a further embodiment in accordance with this invention of a machine for installing compression rings, similar to the machine of FIGS. 21–44.
FIG. 46 is a side elevational view of the machine of FIG. 45.

FIGS. 45 and 46 illustrate a further modified embodiment of a machine for installing compression rings adapted to be shrunk over the object to be fastened. As the embodiment of FIGS. 45 and 46 is quite similar to the machine of FIGS. 21–44, similar parts are designated by similar reference numerals of the 300 such as 310, 311, 311', 330, 330', 333, 335, 360, 360', 370, and 380, and 400 series and therefore will not be described again. Differing from the embodiment of FIGS. 21–44, the guide grooves 351*a* and 351*b* provided in the top and bottom members 352*a*, 352*b* of the slide carriage 350, of which only the top member 352*a* is shown in FIG. 45, extend obliquely toward the center line of the threaded spindle 460 and the spline groove 354 in a direction toward the slide members 320 and 320' so that movement of the pressure rollers 323 in the guide grooves 351*a* and 351*b* in the direction away from their position will cause the arm portions 320*a* and 320*a'* to close the segmental slide members 320 and 320'. This is achieved by causing the slide carriage 350 to move toward the right as viewed in FIG. 45. In other words, contrary to the embodiment of FIGS. 21–44, in which actuation of the segmental slide members 120 and 120' is realized by a movement of the slide carriage 250 toward the left as viewed in FIG. 21 (pushing action), in the embodiment of FIGS. 45 and 46, actuation of the segmental slide members 320 and 320' is realized by a movement of the slide carriage 350 to the right as viewed in FIG. 45, i.e., by a pulling movement. As to the rest, the embodiment of FIGS. 45 and 46 and its operation are similar to that of the embodiment of FIGS. 21–44 with the parts being analogously constructed. What was said with respect to the embodiment of FIGS. 21–44 equally applies to the embodiment of FIGS. 45 and 46, whereby, for example, in lieu of a manual operation of the spindle 460, rotation of the spindle by an electric motor, hydraulic motor or pneumatic motor or replacement of the spindle by a hydraulic, pneumatic or electromagnetic piston cylinder unit is again possible.

The following dimensions in the various figures of the drawing are again merely representative of typical embodiments of this invention but are not to be construed as limitative of the invention and therefore may be varied as known to those skilled in the art. Furthermore, the dimensions indicated in the drawing may be of any appropriate unit, in the particular illustrated embodiments in millimeters. The numbers following any radius R illustrate typical values for such radius.

Figure 3:
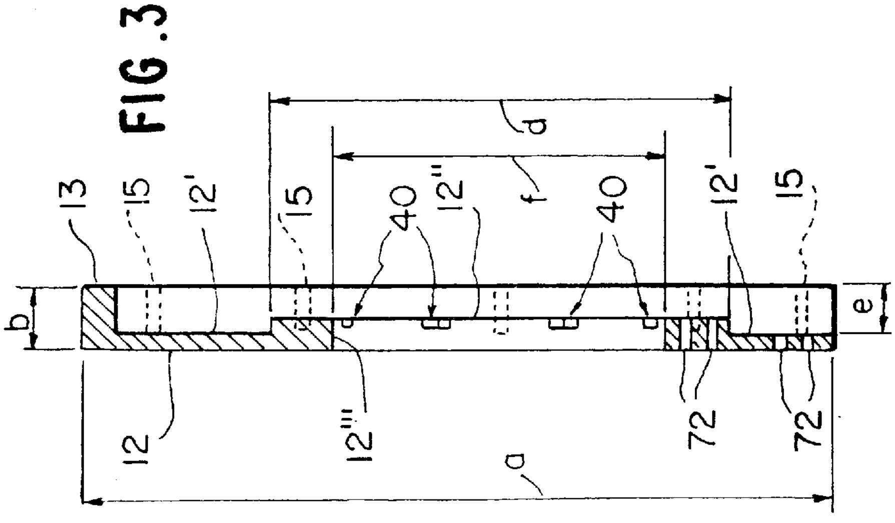
FIG. 3 is a cross-sectional view, taken along line 3—3 of FIG. 2.

Turning first to the embodiment of FIGS. 1 through 19, and more particularly to FIG. 2, the diameter a of the housing 11 is 258 mm. while the diameter c on the inside of the rim 13 is 239 mm. with the rim 13 having a thickness of about 9.5 mm. The thickness b of the housing 11 (FIG. 3) is 20 mm. and the diameter d is 143 mm. while the depth e of recess 12 is 15 mm. The angular spacing between the center lines of channels 41 in adjacent configurations 40 is 45° and the angular opening between surfaces 13' and 13" in FIG. 2 is 71°. In FIGS. 3 and 4, the diameter f of surface 12'" is 105 mm. and the radial distance of the innermost opening 15 from the center O is 59 mm. while the bores 15 are located at a radial distance of 124 mm. from the center O. In FIG. 5, the radial width g of openings 22*a*, 22*b*, 22*c*, 22'*c*, 22'*b* and 22'*a* is 24 mm., the circumferential length of each of these openings is 22.5°, terminating in semi-circles with a radius of 12 mm. at each end. The holes 52 are spaced from one another at a distance of 12 mm. The thickness of each segmental slide member 20 and 20' is 15 mm. In FIG. 6, the lateral spacing between the centers O and O' is about 8.03 mm. with the step portion 29' passing over into the surfaces 29 and 28 by way of a radius of curvature R1. The angle subtended by each internal surface portion 29 is about 19.4° while a set of surfaces 28, 29' and 29 extends over an angle of 45° as measured in the radial direction from the center O.

The width of channel 35 in a segment 30, 30' is 3 mm. while the thickness i of each such segment is 10 mm. and the distance j is 13 mm. (FIG. 9) so that the projection 33 extends by 3 mm. The height h of each segment 30, 30' is 34.85 mm., the height h' being 15.75 mm., and the centers O and O' being displaced by about 7.3 mm. in the lateral direction and about 3.37 mm. in the radial direction. The surface 34 passes over into the steps 34' and 34" and the steps 34' and 34" into the radial surface R72 by way of rounded off corners with a radius of 1 mm. The surface 34 extends over an angle of about 5.6°, and the angle subtended from the points of where the steps 34' and 34" pass over into the radial distance R72 as measured from the center O amounts to about 10.4°. In FIG. 13, the width k of channel 42 is 7.5 mm., the width 1 of channel 41 is 10 mm. and the finger-like end portions 43 and 43' end in semi-circles with a radius of R1. 5 so that the width thereof is 3 mm., and the distance of the centers of the radii for these end portions 43 and 43' from one another is 40 mm. The centers for the radii of R3 are spaced from one another a distance of 26 mm. In FIG. 12, the distance m is 10 mm., the distance n 3 mm. and the distance p 5 mm. while the distance q is 7 mm. In FIG. 14, the distance r is 27.8 mm., the diameter of bore 53 is about 18 mm. or slightly larger to rotatably accommodate the trunion-like bearing surface 55 of the pivot pin 54 which has an external diameter of at most 18 mm. The centers of holes 51 are spaced 12 mm. from one another and the center of bore 53 is spaced from the next-adjacent bore 51 a distance of 27 mm. The surfaces 50' and 50" which are parallel to one another and are spaced at a distance of 2.5 mm. at right angle to their surfaces, from an angle of 5.6° with respect to the opposite surface 53'". In FIG. 15, the outside diameter of pivot pin 54 is 25 mm., its axial length s is 15 mm., the axial length of each trunion-like bearing surface 55 is 5 mm. and the diameter of each trunion-like bearing surface 55 is at most 18 mm. or slightly less to enable free rotation in bore 53. The spindle 60 (FIG. 16) has an overall length of 215 mm. with the length u 90 mm., the length v 120 mm. and the width of disk-like member 65 5 mm. The overall length of the center plate 70 (FIGS. 17–19) is 114 mm., its thickness 7.5 mm., the depth of groove 73 5.5 mm. and the width of groove 73 5.1 mm. The centers of each pair of bores 71 from one another is 8 mm. The spindle 60 has an external right thread 61 of M 12 and an external left thread 62 M 12 whereby bore 56 has an internal thread M 12 matching the external threads 61 and 62 of spindle 60.

Figure 23:
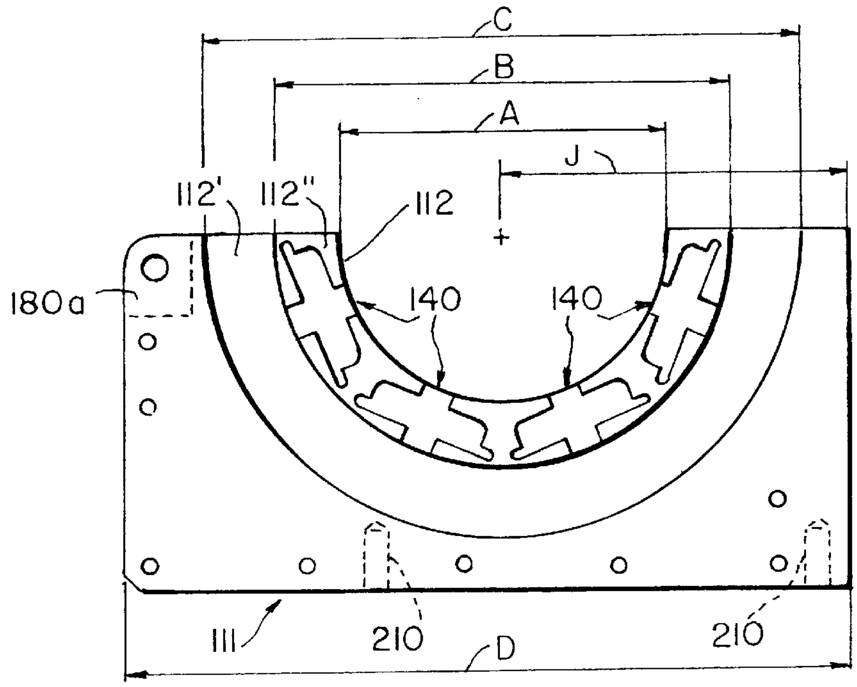
FIG. 23 is a plan view on the lower part of the housing, as viewed in FIG. 21.
Figure 24:
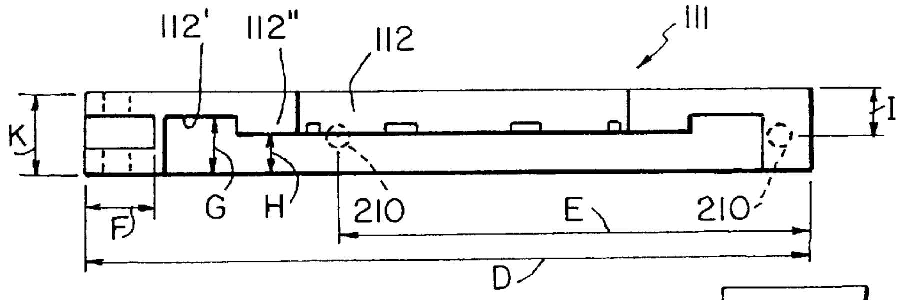
FIG. 24 is an elevational view of the lower housing part of FIG. 23.
Figure 32:
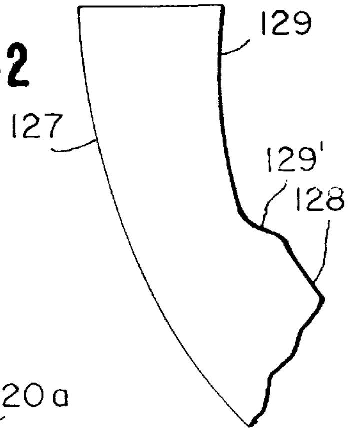
FIG. 32 is a partial view, on an enlarged scale, showing the details of the internal surfaces of the segmental slide member of FIG. 31.
Figure 31:
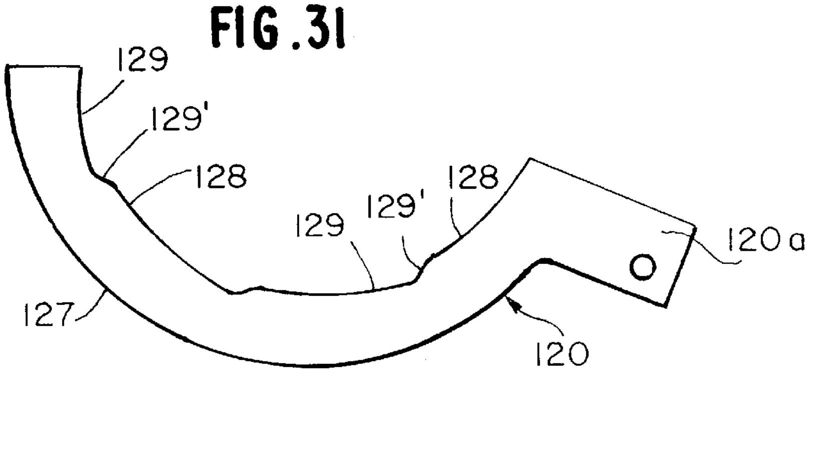
FIG. 31 is a plan view on a segmental slide member.

Turning next to the embodiment of FIGS. 21 through 44, the diameter A is again 105 mm. (FIG. 23), the diameter B 144 mm., the diameter C 190 mm. and the overall width D is 230 mm. In FIG. 24, the distance E is 150 mm., the distance f 22 mm., the depth G 17 mm., the depth H 12 mm.

and the distance I 14.5 mm. while the distance J in FIG. 23 is 110 mm. (see also FIG. 25). The thickness K of housing parts 111 and 111' is 25 mm., depth L in FIG. 26 corresponding to depth G in FIG. 24 is 17 mm. and the depth M in FIG. 26 corresponding to the depth H of FIG. 24 is 12 mm. As to the rest, FIGS. 25 and 26 are similar to FIGS. 23 and 24. The same goes for FIGS. 27 and 28, which are similar to FIGS. 12 and 13. In FIG. 29 and mirror-image-like in FIG. 30, the distance N of the center for the radius R 9.5 from the outer surface of the lower housing cover 112 is 3.8 mm. while the distance P of the center for the radius R 9.5 from the outer surface in FIG. 29 is 46 mm. The two housing covers 29 and 30 are thereby mirror-image like.

Figure 38:
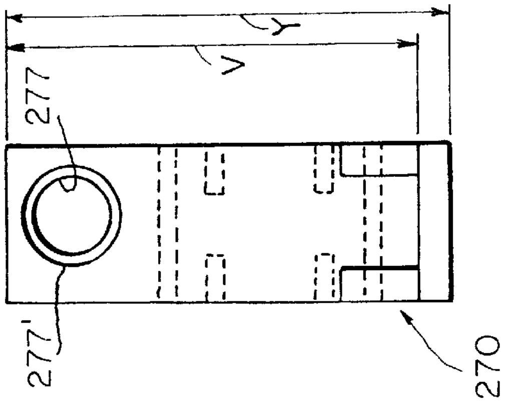
FIG. 38 is a side elevational view of the spindle holder of FIG. 36.
Figure 37:
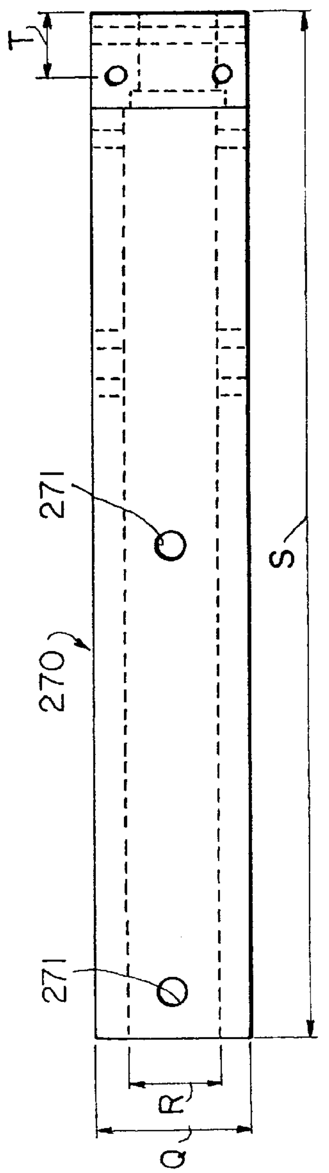
FIG. 37 is a front elevational view of the spindle holder of FIG. 36.
Figure 43:
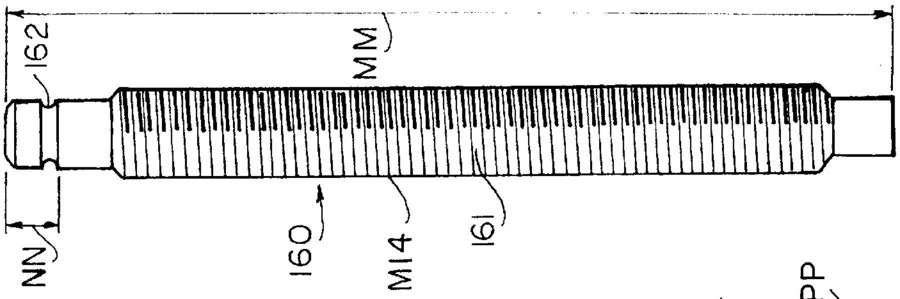
FIG. 43 is an elevational view of the spindle used in the machine of FIG. 21.
Figure 42:
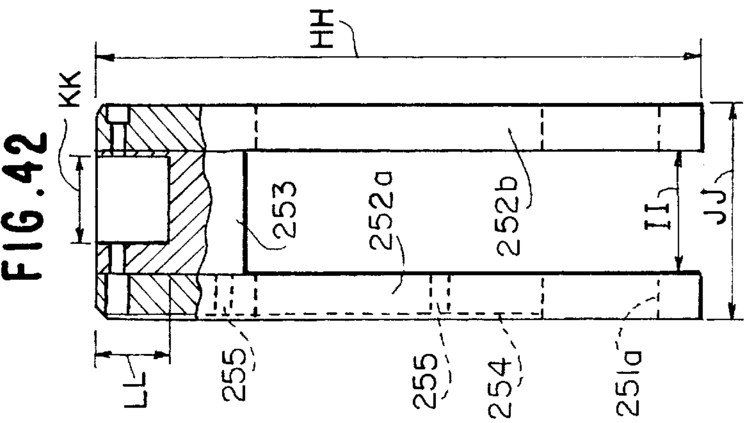
FIG. 42 is a right side elevational view, partly in cross section, of the slide carriage member of FIG. 40.
Figure 41:
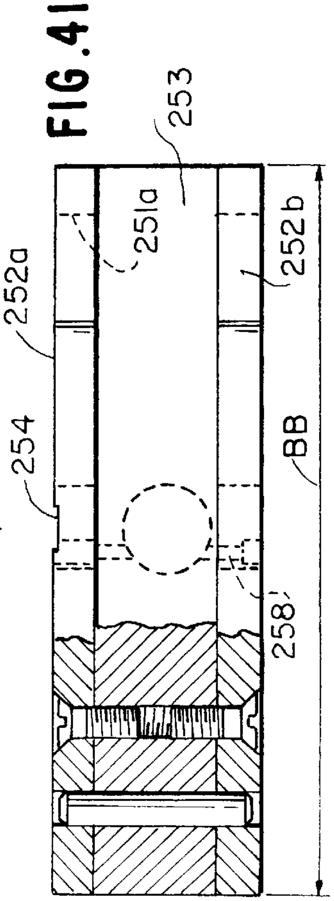
FIG. 41 is a front elevational view, partly in cross section, of the slide carriage member of FIG. 40.

With respect to FIGS. 33, 34 and 35, the dimensions of the segments 130 and 130' are generally similar to those of FIGS. 7 through 10 with the exception that the bottom surface 131' of segments 130, 130' (FIG. 35) is recessed by 0.5 mm. to avoid lateral escape of the ring to be compressed. In FIGS. 36, 37 and 38, the dimension Q is 48 mm., the dimension R 29 mm., the dimension S 323 mm., the dimension T 20 mm., the dimension U 30 mm., the dimension V 130 mm., the dimension W 35 mm., the dimension X 10 mm. and the dimension Y 140 mm. In FIG. 39, the dimension Z is 125 mm., the dimension A—A 133 mm. and the channel 261 10 mm. wide and 4.2 mm. deep. The plate 260 has a thickness of 9.5 mm. In FIGS. 40, 41 and 42, the dimension B—B (FIG. 41) is 170 mm., the dimension C–C (FIG. 40) is 103.5 mm., the dimension D—D in FIG. 40 is 66.5 mm., the dimension E—E in FIG. 40 is 47.25 mm., the width F—F of the channels 251*a* and 251*b* is *19.5* mm., with each channel 251*a* and 251*b* terminating in a semi-circle with a radius of 9.75 mm. The length of channel 251*a* between the centers of the radii of curvature for the semi-circular end portions is 87.73 mm. The spline channel 254 is again 10 mm. wide and the distance G—G in FIG. 40 is 21 mm. while the distance H—H in FIG. 42 is 142 mm. The dimension I—I in FIG. 42 is 29 mm., the dimension J—J is 48 mm., the dimension K—K representing a diametric dimension is 21 mm., the depth L—L is 17 mm. The overall length M—M of spindle 160 in FIG. 43 is 146 mm., the groove 162 is 3 mm. wide and formed by a semi-circle with a radius of 1.5 mm. and the distance N—N in FIG. 43 is 7 mm. The external thread 161 of spindle 160 is M 14 which corresponds to the internal thread M 14 in spindle nut 280. The outside diameter P—P of the disk portion 281 in FIG. 44 is 30 mm. and has an axial length of 5 mm. The axial length of the bearing surface 283 to groove 282 is 25 mm. while groove 282 is 1.3 mm. wide and formed by a semi-circle with a radius of 0.65 mm. The overall axial length Q—Q of nut 280 is 34 mm. and the bearing surface has a diametric dimension R—R of 25 mm.

Figure 21:
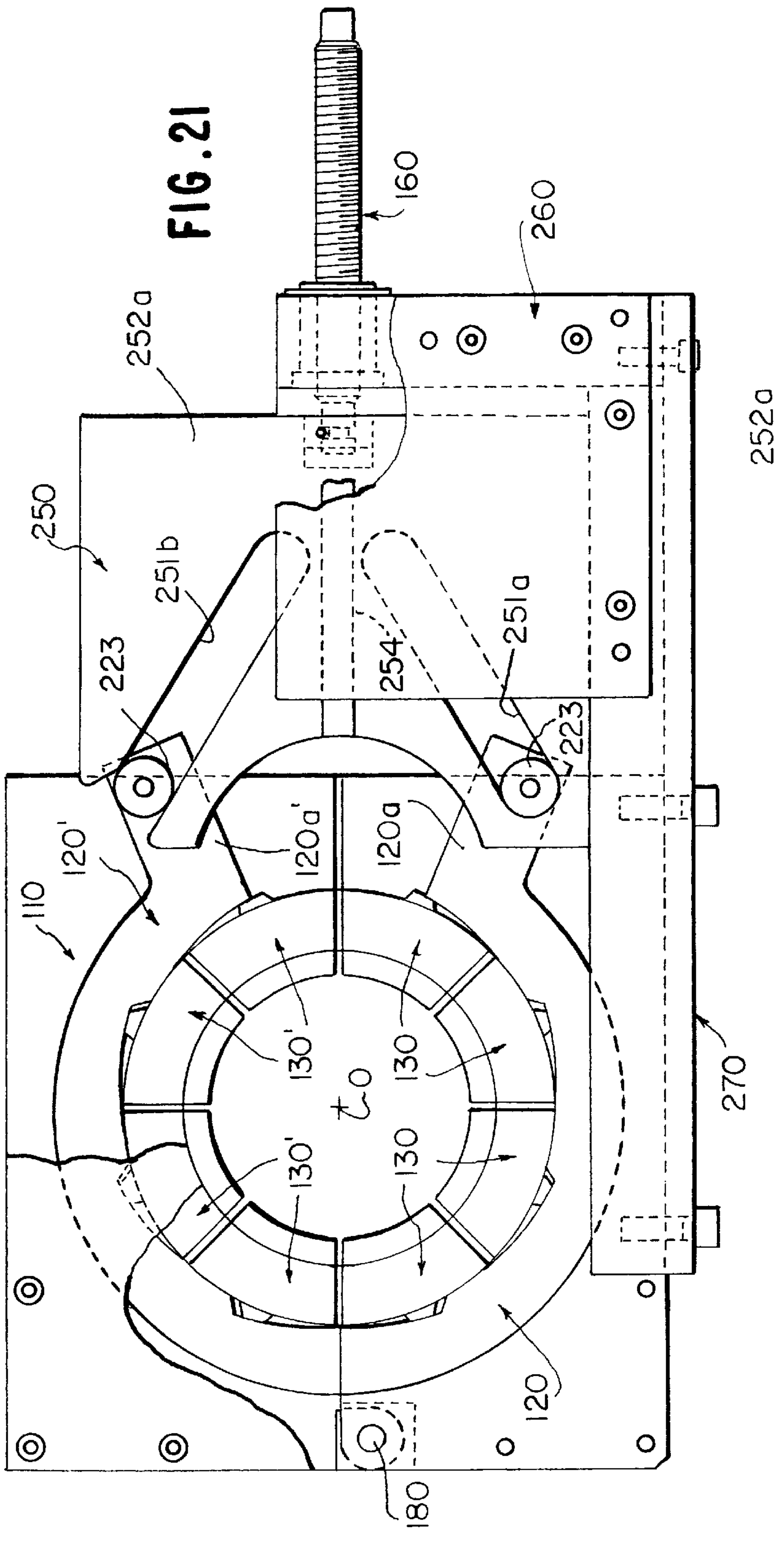
FIG. 21 is a plan view, partly broken away, of another embodiment of a machine for installing compression rings in accordance with the present invention.
Figure 22:
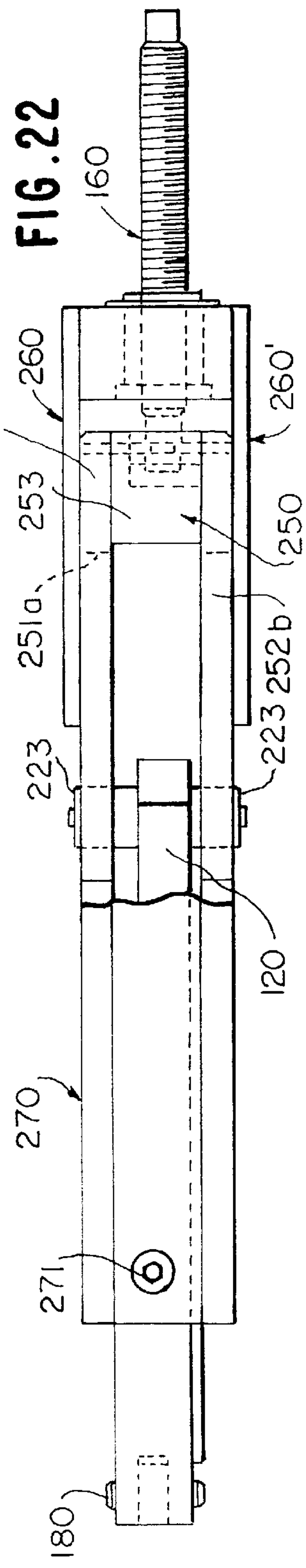
FIG. 22 is a side elevational view of the machine of FIG. 21.

The dimensions of the parts in the embodiments of FIGS. 45 and 46 are similar to those of the embodiment of FIGS. 21 through and any differences such as in the configuration of channels 351*a* and 351*b* are readily within the scope of any person skilled in the art utilizing the teachings of the embodiment of FIGS. 21 through 44.

Accordingly, while I have shown and described only several preferred embodiments of this invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A machine for fastening a compression ring on an object to be fastened by shrinking the ring, comprising housing means having a center, segmental slide members within said housing means and operable to move within said housing means along substantially circular paths about said center, segment means located on the inside of said slide members and having internal surfaces for engagement with a compression ring, said segment means being operable to move in the radial direction in response to actuation by said slide members to engage with an outer surface of a compression ring, said slide members being provided with internal surface portions of non-constant radial distance from said center and said segment means being provided with external surface portions for engagement with said non-concentric surface portions, and actuating means operatively connected with said slide members for actuating said slide members in mutually opposite circumferential directions thereby to apply inwardly directed forces on said segment means when actuated in one direction and release said forces when actuated in the opposite direction.

2. A machine according to claim 1, further comprising means for limiting sliding movement of the slide members along said substantially circular paths.

3. A machine according to claim 2, wherein said limiting means includes substantially circularly shaped external surfaces on said slide members and wall means in said housing means of substantially circular shape which define the substantially circular paths along which said slide members can move.

4. A machine according to claim 2, wherein said limiting means includes elongated openings in each slide member disposed on a circular arc of substantially constant radius and roller members rotatably fixed in the housing means and of a diametric dimension operable to engage in said openings.

5. A machine according to claim 1, wherein said slide members and said segment means are provided with internal and external surfaces, respectively, operatively but not positively connecting said slide members with the segment means.

6. A machine according to claim 5, wherein the internal surfaces of said slide members and the external surfaces of said segment means have portions of substantially complementary shape non-concentric with respect to the center of the machine.

7. A machine according to claim 5, further comprising means for retracting the segment means during opening movement of the slide members when the internal surfaces of the latter increase in radial distance from the center of the machine.

8. A machine according to claim 1, wherein said actuating means includes slide carriage means operable to be moved to and fro, said slide members being provided with outwardly extending arm portions, and connecting means operatively connecting said arm portions with said slide carriage means to transform the to-and-fro movements of said slide carriage means into closing and opening movements of said slide members.

9. A machine according to claim 8, wherein said connecting means include roller means on said arm portions operable to engage in guide means in said slide carriage means.

10. A machine according to claim 1, wherein said actuating means includes two pivot plate means one each operatively connected with a respective one of said slide members, pivot pin means pivotal in said pivot plate means, and a spindle having oppositely directed threaded portions operable to engage with threaded bores in said pivot pin means to cause said slide members to move in mutually opposite directions upon rotation of said spindle means.

11. A machine according to claim 10, further comprising means for holding the spindle against axial movement but enable rotation thereof.

12. A machine according to claim 10, further comprising means for holding said spindle against axial movement but permit rotation thereof, and wherein said slide members each include a substantially radial arm portion, wherein two pivot plate means are provided for each arm portion which are connected to the top and bottom of each arm portion, the pivot plate means forming bearing surfaces for a respective pivot pin means, and said pivot pin means being provided with internal threaded bores of a thread complementary to the threaded portions of the spindle.

13. A machine according to claim 1, wherein said housing means is made of two parts pivotally connected with each other to enable opening thereof.

14. A machine according to claim 13, wherein said segmental slide members and said segment means are provided with internal and external surfaces, respectively, operatively but not positively connecting the segment means with said slide members.

15. A machine according to claim 14, wherein the internal surfaces of said slide members and the external surfaces of said segment means have portions of substantially complementary shape non-concentric with respect to the center of the machine.

16. A machine according to claim 15, further comprising spring means for retracting the segment means during opening movement of the slide members when the internal surfaces of the latter increase in radial distance from the center of the machine.

17. A machine according to claim 1, further comprising complementary means in said housing means and on said segment means for limiting movement of said segment means in a substantially radial direction.

18. A machine according to claim 17, wherein said complementary means include substantially radially extending channels in one of said housing means and said segment means and projections on the other of said housing means and said segment means of a shape complementary to said channels.

19. A machine according to claim 18, further comprising spring means in said complementary means to retract said segment means in a radially outward direction during opening movement of slide members.

20. A machine for fastening a compression ring on an object to be fastened by shrinking the ring, comprising housing means, segmental slide members within said housing means, means for limiting sliding movement of said slide members within said housing means along circular paths with a constant radius about a center, segment means on the inside of said slide members and operable to move in a radial direction, said slide members being provided with internal surface portions of non-constant radial distance from said center and said segment means being provided with surface portions for engagement with said internal surface portions of the slide members, and means operatively connected with said slide members including pivot plate means and pivot pin means pivotal in said pivot plate means for actuating said slide members in opposite circumferential directions.

21. A machine according to claim 20, wherein said means limiting sliding movement of the segmental slide members along circular paths includes elongated openings in each slide member disposed on a circular arc of substantially constant radius and roller members rotatably fixed in the housing means and of a diametric dimension operable to engage in said openings.

22. A machine for fastening a compression ring on an object to be fastened by shrinking the ring, comprising housing means having a center, segmental slide members within said housing means and operable to move within said housing means along substantially circular paths, segment means on the inside of said slide members and operable to move in a radial direction, said slide members being provided with internal surface portions of non-constant radial distance from a center, said segment means being provided with external surface portions for engagement with said non-concentric surface portions, and actuating means operatively connected with said slide members for actuating said slide members in opposite circumferential directions including a slide carriage means whose to-and-fro movements are converted into sliding movements of the slide members along the circular paths in opposite directions, respectively.

23. A machine according to claim 22, further comprising means for limiting the to-and-fro movements of said carriage means to rectilinear movements.

24. A machine according to claim 23, wherein said limiting means includes a spline connection between said carriage means and a relatively fixed part along which said. slide carriage means moves.

25. A machine according to claim 24, further comprising complementary means in said housing means and on said segment means for limiting movement of said segment means in a substantially radial direction.

26. A machine according to claim 25, wherein said complementary means include substantially radially extending channels in one of said housing means and said segment means and projections on the other of said housing means and said segment means of a shape complementary to said channels.

27. A machine according to claim 26, further comprising spring means in said complementary means to retract said segment means in a radially outward direction during opening movement of slide members.

* * * * *

US005890270C1

(12) EX PARTE REEXAMINATION CERTIFICATE (5518th)

United States Patent

Oetiker

(10) Number: US 5,890,270 C1
(45) Certificate Issued: Sep. 19, 2006

(54) APPARATUS FOR INSTALLING CLAMPING RINGS

(75) Inventor: Hans Oetiker, Horgen (CH)

(73) Assignee: Hans Oetiker AG Maschine-und Apparatefabrik, Horgen (CH)

Reexamination Request:
No. 90/005,643, Feb. 24, 2000

Reexamination Certificate for:

| | |
|---|---|
| Patent No.: | **5,890,270** |
| Issued: | **Apr. 6, 1999** |
| Appl. No.: | **08/795,708** |
| Filed: | **Feb. 4, 1997** |

Related U.S. Application Data

(60) Provisional application No. 60/011,984, filed on Feb. 21, 1996, and provisional application No. 60/032,005, filed on Nov. 25, 1996.

(51) Int. Cl.
*B23P 19/02* (2006.01)

(52) U.S. Cl. ............................ 29/235; 29/238; 29/282; 72/402

(58) Field of Classification Search ...................... None
See application file for complete search history.

(56) References Cited

U.S. PATENT DOCUMENTS 4,989,443 A * 2/1991 Sawdon ...................... 72/402

* cited by examiner

*Primary Examiner*—Lee D. Wilson

(57) ABSTRACT

A machine for fastening a compression ring on an object to be fastened by shrinking the ring in which segmental actuating slide members are movable within a housing along circular paths with a constant radius about a center, and in which segments on the inside of the slide members are operable to move a limited distance in the radial direction; the segmental slide members are provided with internal surface portions of non-constant radial distance from a center, and the segments are provided with surface portions for abutment with the non-concentric surface portions on the inside of the slide members; an actuating mechanism operatively connected with the slide members causes the latter to close and thereby forces the segments to reduce the inside diametric dimension thereof which in turn causes compression of a shrink-ring held thereat.

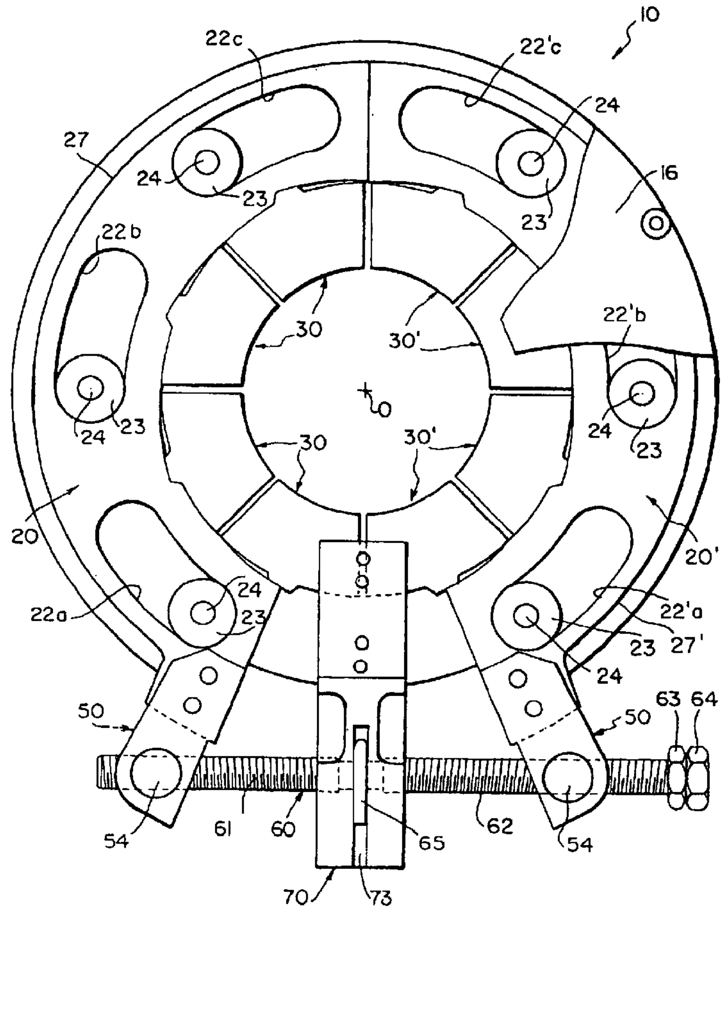

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 20 and 21 is confirmed.

Claims 2–4, 8, 10 and 13–16 are cancelled.

Claims 1, 9, 11, 12 and 22 are determined to be patentable as amended.

Claims 5–7, 17–19 and 23–27, dependent on an amended claim, are determined to be patentable.

New claims 28–43 are added and determined to be patentable.

1. A machine for fastening a compression ring on an object to be fastened by shrinking the ring, comprising housing means having a center, segmental slide members within said housing means and operable to move within said housing means along substantially circular paths about said center, *several* segment means located on the inside of said slide members and having internal surfaces for engagement with a compression ring, said segment means being operable to move in radial direction in response to actuation by said slide members to engage with outer surface of a compression ring, said slide members being provided with internal surface portions of non-constant radial distance from said center and said segment means being provided with external surface portions for *operative* engagement with said non-concentric surface portions, [and] actuating means operatively connected with said slide members for actuating said slide members in mutually opposite circumferential directions thereby to apply inwardly directed forces on said segment means when actuated in one direction and release said forces when actuated in the opposite direction*, and means for limiting sliding movements of said slide members along said substantially circular paths including elongated openings in each slide member disposed on a circular arc of substantially constant radius and roller members rotatably fixed in the housing means and of a diametric dimension operable to engage in said openings*.

9. A machine according to claim [8] *37*, wherein said connecting means include roller means on said arm portions operable to engage in guide means in said slide carriage means.

11. A machine according to claim [10] *38*, further comprising means for holding the spindle against axial movement but enable rotation thereof.

12. A machine according to claim [10] *38*, further comprising means for holding said spindle against axial movement but permit rotation thereof, and wherein said slide members each include a substantially radial arm portion, wherein two pivot plate means are provided for each arm portion which are connected to the top and bottom of each arm portion, the pivot plate means forming bearing surfaces for a respective pivot pin means, and said pivot pin means being provided with internal threaded bores of a thread complementary to the threaded portions of the spindle.

22. A machine for fastening a compression ring on an object to be fastened by shrinking the ring, comprising housing means having a center, segmental slide members within said housing means and operable to move within said housing means along substantially circular paths, segment means on the inside of said slide members and operable to move in a radial direction, said slide members being provided with internal surface portions of non-constant radial distance from a center, said segment means being provided with external surface portions for engagement with said non-concentric surface portions, *a slide carriage means operable to carry out to-and-fro movements,* and actuating means operatively [connected with said slide members] *connecting said slide carriage means with said slide members by way of two separate connections* for actuating said slide members in opposite circumferential directions [including a slide carriage means whose to-and-fro movements are converted] *by converting the to-and-fro movements of said slide carriage means* into sliding movements of the slide members along the circular paths in opposite directions, respectively.

*28. A machine for fastening a compression ring on an object to be fastened by shrinking the ring, comprising housing means having a center, segmental slide members within said housing means and operable to move within said housing means along substantially circular paths about said center, segment means located on the inside of said slide members and having internal surfaces for engagement with a compression ring, said segment means being operable to move in a radial direction in response to actuation by said slide members to engage with the outer surface of a compression ring, said slide members being provided with surface portions of non-constant radial distance from said center and said segment means being provided with surface portions for engagement with said non-concentic surface portions, and actuating means operatively connected with said slide members for actuating said slide members in mutually opposite circumferential directions thereby to apply inwardly directed forces on said segment means when actuated in opposite directions and release said forces when actuating in the opposite direction, said housing means being made of two parts and pivotal connecting means pivotally connecting said two housing means with each other about an axis parallel to the axis containing the center.*

*29. A machine for fastening a compression ring on an object to be fastened by shrinking the ring, comprising housing means having a center, segmental slide members within said housing means and operable to move within said housing means along substantially circular paths about said center, outwardly extending arm portions connected to said slide members, several segment means located on the inside of said slide members and operable to move a radial direction in response to actuation by said slide members to engage with the outer surface of a compression ring, a first connection operatively connecting said slide members with said segment means to convert sliding movements of said sliding members along the circular paths into radial move-*

*ments of said segment means including slide member surface portions of non-constant radial distance from the center of said slide members in operative engagement with surface portions of said segment means, and actuating means including a slide carriage operable to move only along a rectilinear to-and-fro path, and a second connection operatively connecting said slide carriage with said slide members by way of said arm portions for actuating said slide members in mutually opposite circumferential directions along the circular paths in response to the rectilinear to-and-fro movements.*

*30. A machine according to claim 29, wherein said carriage is provided with non-parallel guide grooves and said second connection includes roller members in engagement with said guide grooves.*

*31. A machine according to claim 30, wherein said guide grooves converge in the direction toward said housing means.*

*32. A machine according to claim 30, wherein said guide grooves diverge in the direction toward said housing means.*

*33. A machine for fastening a compression ring on an object to be fastened by shrinking the ring, comprising housing means having a center, segmental slide members within said housing means and operable to move within said housing means along substantially circular paths about said center, outwardly extending arm portions connected to said slide members, several segment means located on the inside of said slide members and operable to move in a radial direction in response to actuation by said slide members to engage with the outer surface of a compression ring, a first connection operatively connecting said slide members with said segment means to convert sliding movements of said sliding members along the circular paths into radial movements of said segment means including slide member surface portions of non-constant radial distance from the center of said slide members in operative engagement with surface portions of said segment means, actuating means including a slide carriage operable to carry out rectilinear to-and-fro movements and a second connection operatively connecting said slide carriage with said slide members by way of said arm portions for actuating said slide members in mutually opposite circumferential directions along the circular paths, and means for limiting sliding movement of the slide members along said substantially circular paths including elongated openings in said slide members disposed on circular arcs of substantially constant radius and a third connection between said housing means and each of said openings to limit movement of said sliding members to the extent permitted by movement of said third connection in said openings.*

*34. A machine according to claim 33, wherein said second connection includes guide grooves into which engage said roller members.*

*35. A machine for fastening a compression ring on an object to be fastened by shrinking the ring, comprising housing means having a center, segmental slide members within said housing means and operable to move within said housing means along substantially circular paths about said center, several segment means located on the inside of said slide members and having internal surfaces for engagement with a compression ring, said segment means being operable to move in a radial direction in response to actuation by said slide members to engage with the outer surface of a compression ring, said slide members being provided with internal surface portions of non-constant radial distance from said center and said segment means being provided with external surface portions for operative engagement with said non-concentric surface portions, and actuating means operatively connected with said slide members for actuating said slide members in mutually opposite circumferential directions, thereby to apply inwardly directed forces on said segment means when actuated in opposite directions and release said forces when actuated in the opposite direction, said actuating means including slide carriage means operable to be moved to and fro, said slide members being provided with outwardly extending arm portions, and connecting means operatively connecting said arm portion with said slide carriage means to transform the to-and-fro movements of said slide carriage means into closing and opening movements of said slide members.*

*36. A machine for fastening a compression ring on an object to be fastened by shrinking the ring, comprising housing means having a center, segmental slide members within said housing means and operable to move within said housing means along substantially circular paths about said center, segment means located on the inside of said slide members and having internal surfaces for engagement with a compression ring, said segment means being operable to move in the radial direction in response to actuation by said slide members to engage with the outer surface of a compression ring, said slide members being provided with internal surface portions of non-constant radial distance from said center and said segment means being provided with external surface portions for engagement with said non-concentric surface portions, and actuating means operatively connected with said slide members for actuating said slide members in mutually opposite circumferential directions thereby to apply inwardly directed forces on said segment means when actuated in opposite directions and release said forces when actuated in the opposite direction, wherein said actuating means includes two pivot plate means one each operatively connected with a respective one of said slide members, pivot pin means pivotal in said pivot plate means, and a spindle having oppositely directed threaded portions operable to engage with threaded bores in said pivot pin means to cause said slide members to move in mutually opposite directions upon rotation of said spindle means.*

*37. A machine for fastening a compression ring on an object to be fastened by shrinking the ring, comprising housing means having a center, segmental slide members within said housing means and operable to move within said housing means along substantially circular paths about said center, segment means located on the inside of said slide members and having internal surfaces for engagement with a compression ring, said segment means being operable to move in a radial direction in response to actuation by said slide members to engage with the outer surface of a compression ring, said slide members being provided with surface portions of non-constant radial distance from said center and said segment means being provided with surface portions for engagement with said non-concentric surface portions, and actuating means operatively connected with said slide members for actuating said slide members in mutually opposite circumferential directions thereby to apply inwardly directed forces on said segment means when*

*actuated in opposite directions and release said forces when actuating in the opposite direction, said housing means being made of two parts and pivotal connecting means pivotally connecting said two housing with each other about an axis parallel to the axis containing the center.*

*38. A machine for fastening a compression ring on an object to be fastened by shrinking the ring, comprising housing means having a center, segmental slide members within said housing means and operable to move within said housing means along substantially circular paths about said center, outwardly extending arm portions connected to said slide members, several segment means located on the inside of said slide members and operable to move in a radial direction in response to actuation by said slide members to engage with the outer surface of a compression ring, a first connection operatively connecting said slide members with said segment means to convert sliding movements of said sliding members along the circular paths into radial movements of said segment means including slide member surface portions of non-constant radial distance from the center of said slide members in operative engagement with surface portions of said segment means, and actuating means including a slide carriage operable to move only along a rectilinear to-and-fro path, and a second connection operatively connecting said slide carriage with said slide members by way of said arm portions for actuating said slide members in mutually opposite circumferential directions along the circular paths in response to the rectilinear to-and-fro movements.*

*39. A machine according to claim 38, wherein said carriage is provided with non-parallel guide grooves and said second connection includes roller members in engagement with said guide grooves.*

*40. A machine according to claim 39, wherein said guide grooves converge in the direction toward said housing means.*

*41. A machine according to claim 39, wherein said guide grooves diverge in the direction toward said housing means.*

*42. A machine for fastening a compression ring on an object to be fastened by shrinking the ring, comprising housing means having a center, segmental slide members within said housing means and operable to move within said housing means along substantially circular paths about said center, outwardly extending arm portions connected to said slide members, several segment means located on the inside of said slide members and operable to move in a radial direction in response to actuation by said slide members to engage with the outer surface of a compression ring, a first connection operatively connecting said slide members with said segment means to convert sliding movements of said sliding members along the circular paths into radial movements of said segment means including slide member surface portions of non-constant radial distance from the center of said slide members in operative engagement with surface portions of said segment means, actuating means including a slide carriage operable to carry out rectilinear to-and-fro movements and a second connection operatively connecting said slide carriage with said slide members by way of said arm portions for actuating said slide members in mutually opposite circumferential directions along the circular paths, and means for limiting sliding movement of the slide members along said substantially circular paths including elongated openings in said slide members disposed on circular arcs of substantially constant radius and a third connection between said housing means and each of said openings to limit movement of said sliding members to the extent permitted by movement of said third connection in said openings.*

*43. A machine according to claim 42, wherein said second connection includes guide grooves into which engage said roller members.*

* * * * *